US008695884B2

(12) United States Patent
Baym et al.

(10) Patent No.: US 8,695,884 B2
(45) Date of Patent: Apr. 15, 2014

(54) SYSTEMS, DEVICES, ADMIXTURES, AND METHODS INCLUDING TRANSPONDERS FOR INDICATION OF FOOD ATTRIBUTES

(76) Inventors: Michael H. Baym, Cambridge, MA (US); Paul Holman, Seattle, WA (US); Roderick A. Hyde, Redmond, WA (US); Edward K. Y. Jung, Bellevue, WA (US); Jordin T. Kare, Seattle, WA (US); Erez Lieberman, Cambridge, MA (US); Nathan P. Myhrvold, Bellevue, WA (US); Lowell L. Wood, Jr., Bellevue, WA (US)

( * ) Notice: Subject to any disclaimer, the term of this patent is extended or adjusted under 35 U.S.C. 154(b) by 0 days.

(21) Appl. No.: 13/199,371

(22) Filed: Aug. 25, 2011

(65) Prior Publication Data
US 2013/0048738 A1 Feb. 28, 2013

Related U.S. Application Data

(63) Continuation of application No. 13/199,360, filed on Aug. 25, 2011.

(51) Int. Cl.
*G06K 7/08* (2006.01)
*G06K 19/06* (2006.01)

(52) U.S. Cl.
USPC .......................................... 235/492; 235/451

(58) Field of Classification Search
USPC ......... 235/375, 385, 451, 383, 492; 340/10.1, 340/10.2, 12.51, 572.1, 572.2, 539.12
See application file for complete search history.

(56) References Cited

U.S. PATENT DOCUMENTS

| | | | |
|---|---|---|---|
| 5,350,783 A | 9/1994 | Reich | |
| 5,663,288 A | 9/1997 | Shinoda et al. | |
| 6,294,997 B1 | 9/2001 | Paratore et al. | |
| 6,747,121 B2 | 6/2004 | Gogolewski | |
| 7,017,822 B2 * | 3/2006 | Aisenbrey | 235/487 |
| 7,027,419 B1 | 4/2006 | Hokao | |
| 7,055,754 B2 | 6/2006 | Forster | |
| 7,068,368 B1 | 6/2006 | Nagayoshi et al. | |
| 7,253,716 B2 * | 8/2007 | Lovoi et al. | 340/10.1 |
| 7,348,890 B2 | 3/2008 | Barber et al. | |
| 7,602,288 B2 * | 10/2009 | Broussard | 340/572.1 |
| 7,616,111 B2 | 11/2009 | Covannon et al. | |
| 7,733,218 B2 | 6/2010 | Drago et al. | |
| 7,782,189 B2 | 8/2010 | Spoonhower et al. | |
| 7,796,043 B2 | 9/2010 | Euliano et al. | |
| 7,873,122 B2 | 1/2011 | Chung | |
| 7,884,724 B2 | 2/2011 | Tuttle et al. | |
| 7,900,835 B2 | 3/2011 | Togashi et al. | |
| 2001/0029996 A1 | 10/2001 | Robinson | |
| 2002/0097153 A1 | 7/2002 | Youbok et al. | |
| 2003/0001009 A1 | 1/2003 | Collins et al. | |
| 2004/0028780 A1 | 2/2004 | Maser et al. | |
| 2004/0103043 A1 | 5/2004 | Reade et al. | |
| 2004/0121061 A1 | 6/2004 | Uchida et al. | |
| 2004/0238617 A1 | 12/2004 | Miyagawa | |

(Continued)

OTHER PUBLICATIONS

U.S. Appl. No. 13/199,358, filed Aug. 25, 2011, Baym et al.

(Continued)

*Primary Examiner* — Tuyen K Vo

(57) ABSTRACT

Systems, devices, admixtures, and methods are described including transponder devices (e.g., a palatable transponder, an edible transponder, a palatable radio frequency identification (RFID) tag, an edible RFID tag, etc.) for admixing with a food product.

36 Claims, 11 Drawing Sheets

(56) References Cited

U.S. PATENT DOCUMENTS

| | | | |
|---|---|---|---|
| 2005/0019388 A1 | 1/2005 | Furuta et al. | |
| 2005/0131281 A1* | 6/2005 | Ayer et al. | 600/302 |
| 2006/0169294 A1 | 8/2006 | Kaler et al. | |
| 2006/0192655 A1 | 8/2006 | Levin | |
| 2006/0283945 A1* | 12/2006 | Excoffier et al. | 235/439 |
| 2007/0008113 A1* | 1/2007 | Spoonhower et al. | 340/539.12 |
| 2007/0152829 A1 | 7/2007 | Lindsay et al. | |
| 2007/0176773 A1 | 8/2007 | Smolander et al. | |
| 2007/0252677 A1 | 11/2007 | Hansen et al. | |
| 2008/0198012 A1 | 8/2008 | Kamen | |
| 2009/0072974 A1 | 3/2009 | Miyashita et al. | |
| 2009/0110778 A1 | 4/2009 | Muscroft et al. | |
| 2009/0175323 A1 | 7/2009 | Chung | |
| 2009/0243749 A1 | 10/2009 | Rofougaran | |
| 2010/0079288 A1 | 4/2010 | Collins et al. | |
| 2010/0191306 A1 | 7/2010 | Stevenson et al. | |
| 2010/0234071 A1 | 9/2010 | Shabtay et al. | |
| 2011/0153871 A1* | 6/2011 | Ferragut et al. | 710/8 |
| 2012/0038918 A1 | 2/2012 | Liu et al. | |

OTHER PUBLICATIONS

U.S. Appl. No. 13/199,359, filed Aug. 25, 2011, Baym et al.
U.S. Appl. No. 13/199,370, filed Aug. 25, 2011, Baym et al.
U.S. Appl. No. 13/199,372, filed Aug. 25, 2011, Baym et al.
"GRAS Notice Inventory"; FDA U.S. Food and Drug Administration; printed on Aug. 9, 2011; pp. 1-4.
Palmer et al.; "Current developments in peanut allergy"; Current Opinion in Allergy and Clinical Immunology; bearing a date of 2006, printed on Jul. 19, 2011; vol. 6; pp. 202-206; Lippincott Williams & Wilkins.
Masters, Amelia; "Humancentric applications of RFID: the current state of development"; University of Wollongong Thesis Collections; bearing a date of 2003; 122 pages; University of Wollongong Research Online.
PCT International Search Report; International App. No. PCT/US 12/52048; Jan. 8, 2013; pp. 1-5.
Jung, Scott; "NutriSmart: Edible RFID Tags for the Future"; Medgadget.com; Jun. 1, 2011; pp. 1-3; Medgadget LLC; located at: http://www.medgadget.com/2011/06/edible-rfid-tags-tell-you-more-about-your-food-nags-you-to-eat-your-broccoli.html.
"NutriSmart"; a video presentation from vimeo.com; May 27, 2011; located at http://vimeo.com/24332950 (video not submitted herewith).
Ripsin et al.; "Management of Blood Glucose in Type 2 Diabetes Mellitus"; American Family Physician; Jan. 1, 2009; pp. 29-36; vol. 79, No. 1; American Academy of Family Physicians.

* cited by examiner

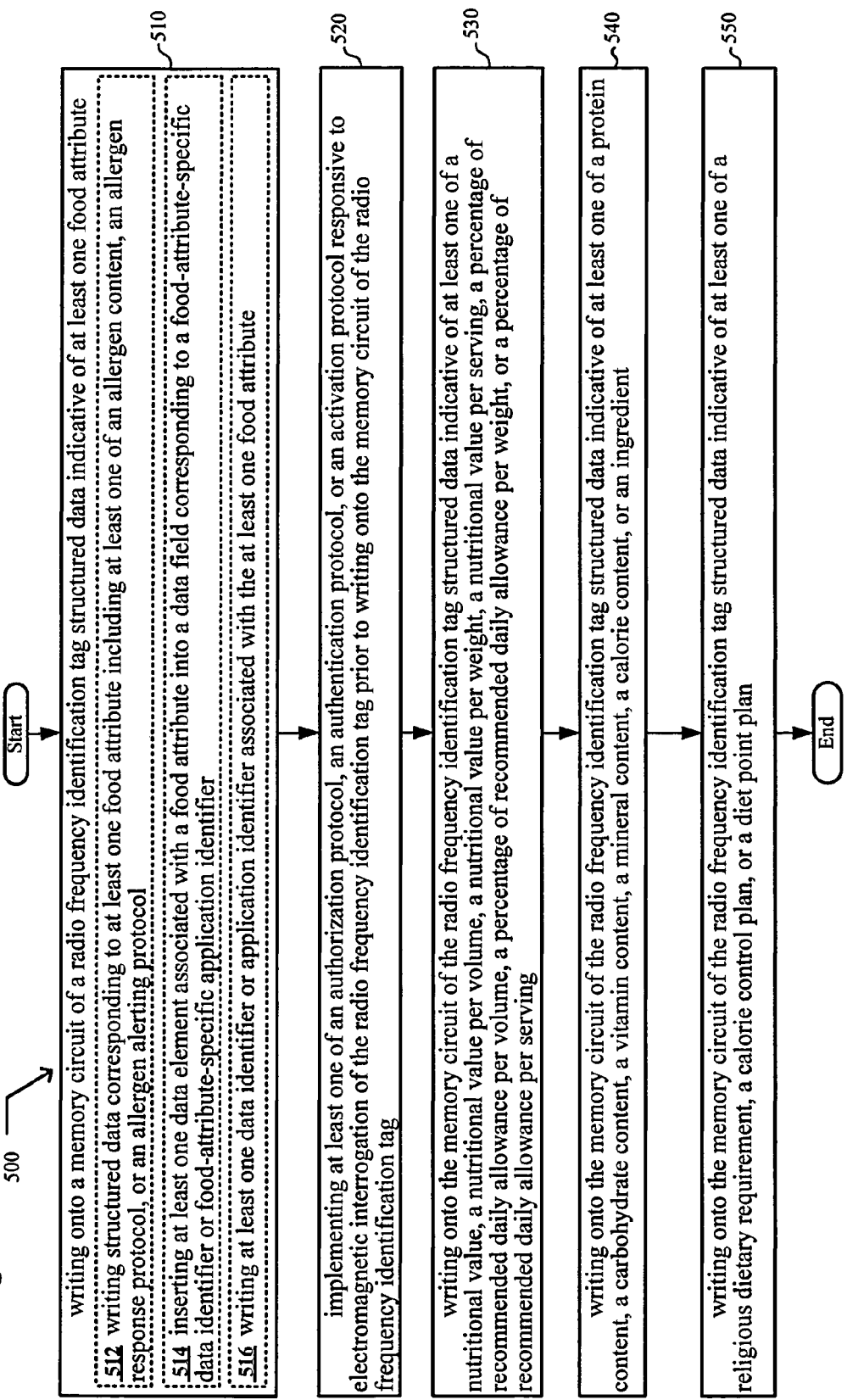

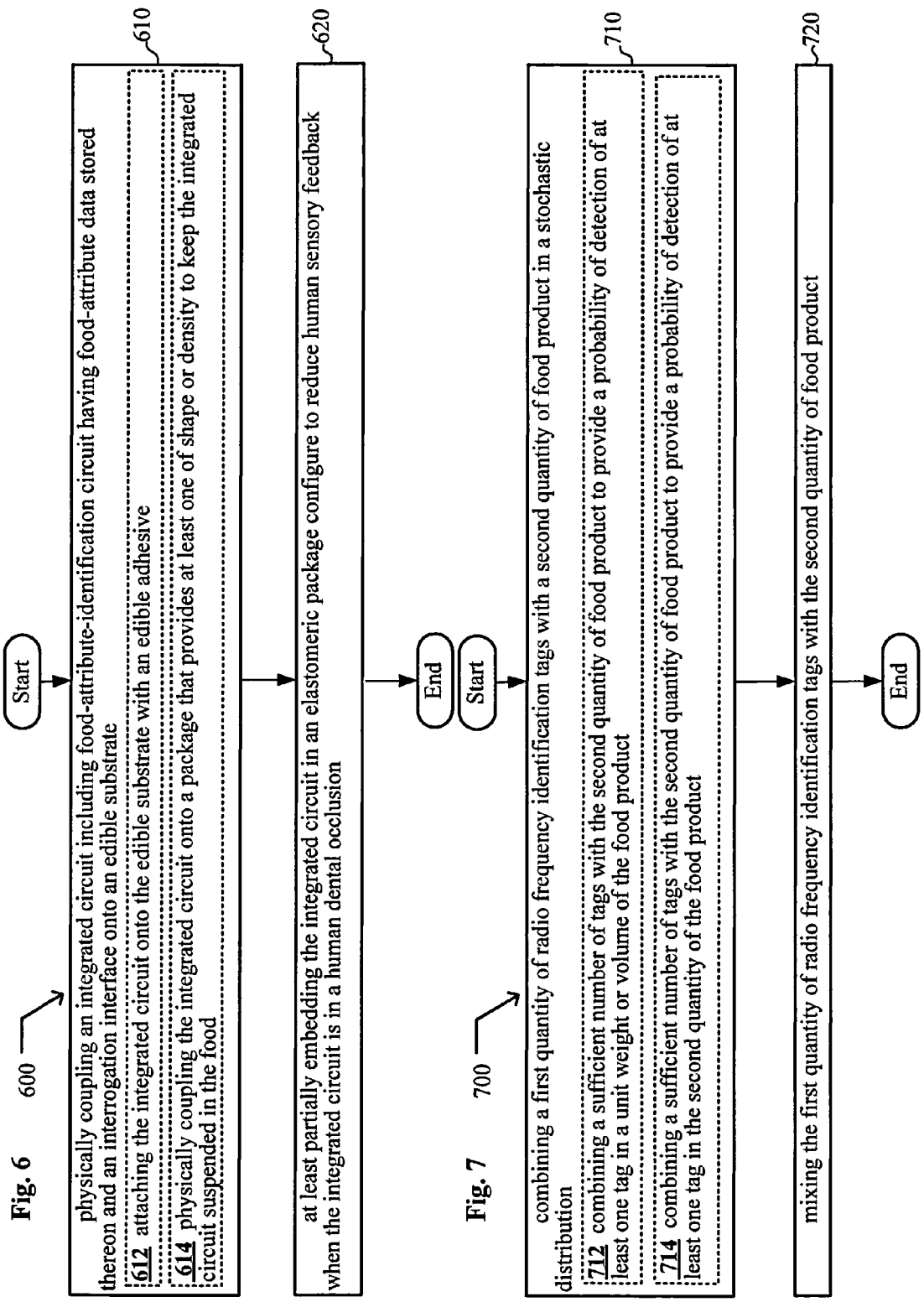

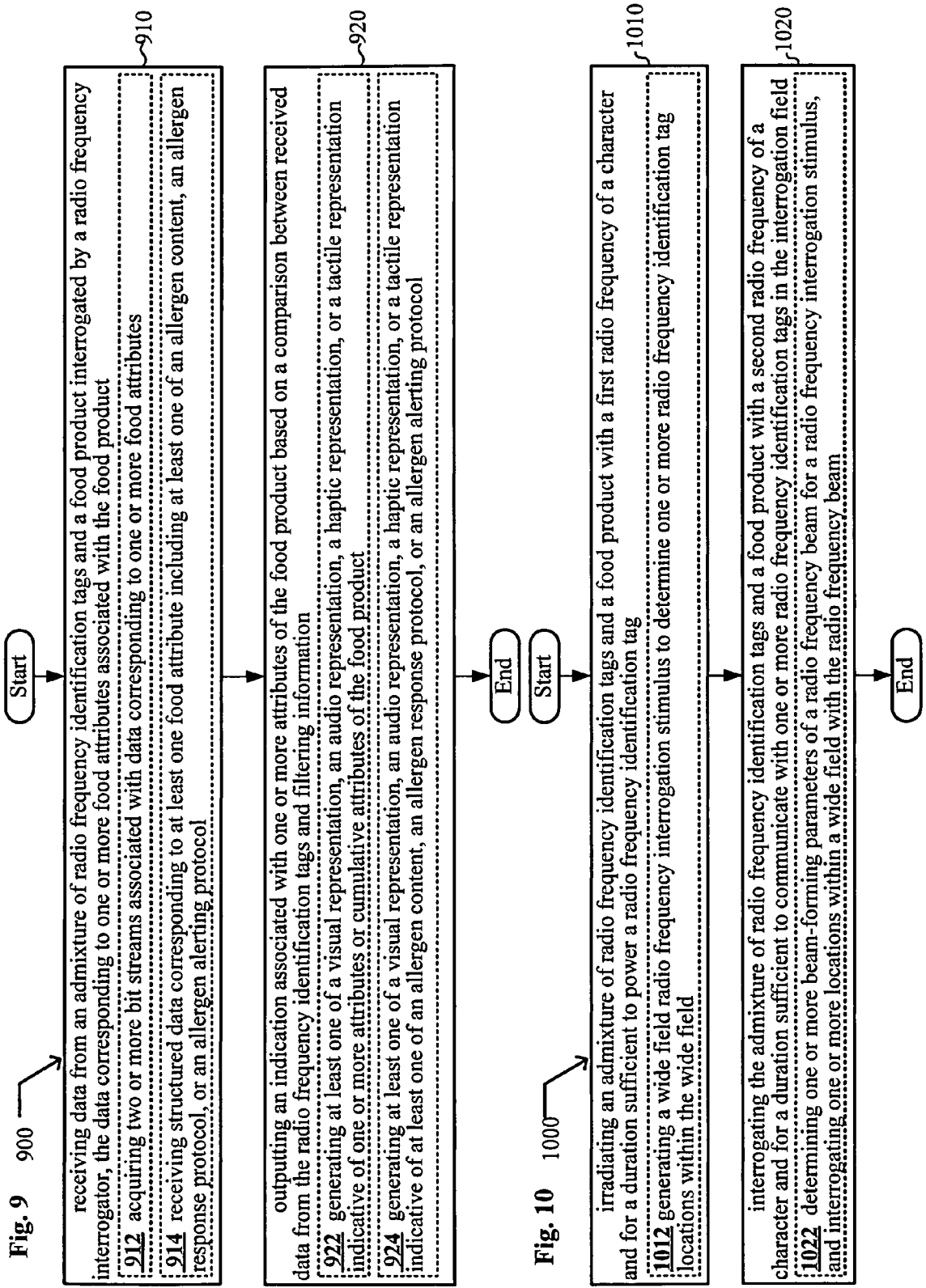

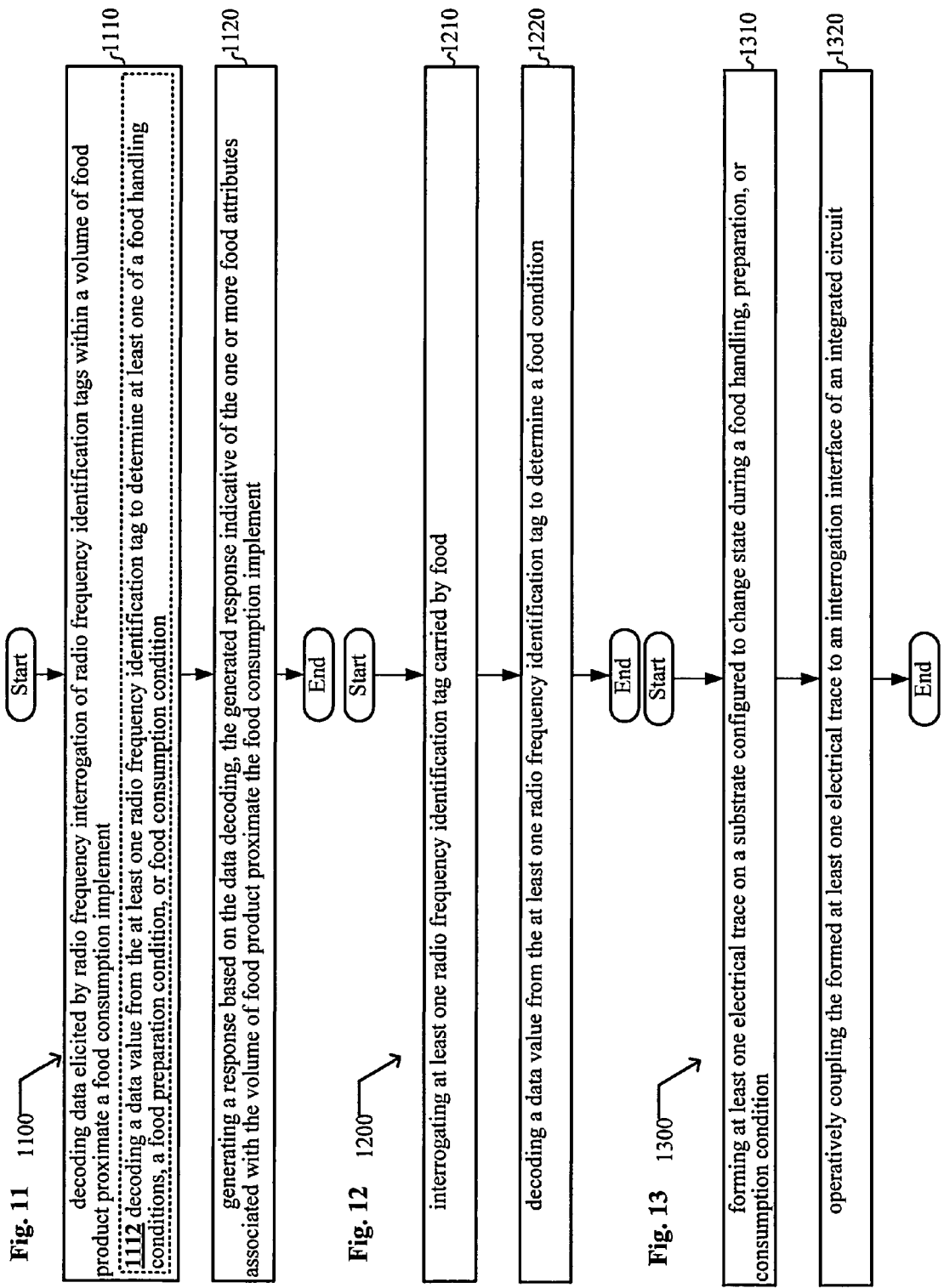

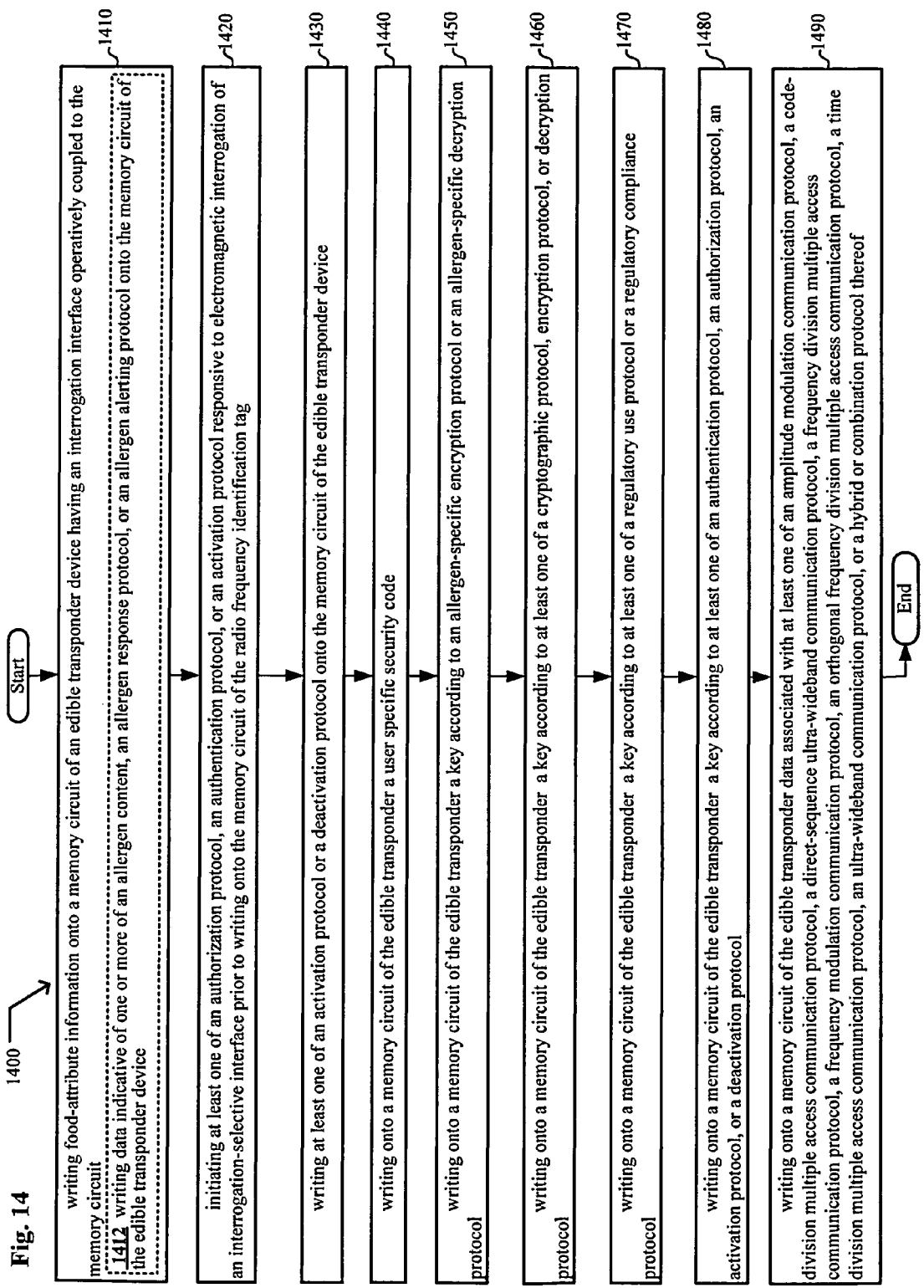

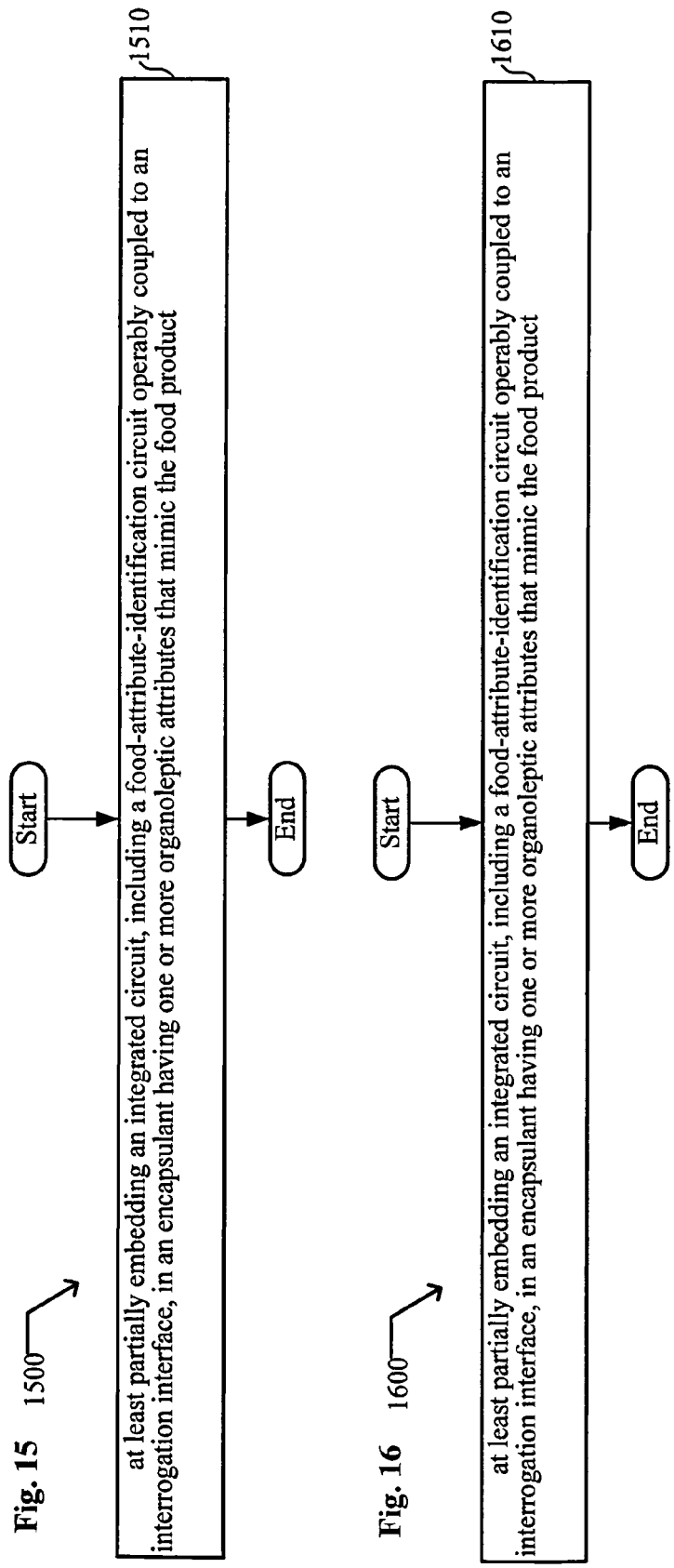

US 8,695,884 B2

SYSTEMS, DEVICES, ADMIXTURES, AND METHODS INCLUDING TRANSPONDERS FOR INDICATION OF FOOD ATTRIBUTES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation of U.S. patent application Ser. No. 13/199,360, entitled SYSTEMS, DEVICES, ADMIXTURES, AND METHODS INCLUDING TRANSPONDERS FOR INDICATION OF FOOD ATTRIBUTES, naming MICHAEL H. BAYM; PAUL HOLMAN; RODERICK A. HYDE; EDWARD K. Y. JUNG; JORDIN T. KARE; EREZ LIEBERMAN; NATHAN P. MYHRVOLD; LOWELL L. WOOD, JR. as inventors, filed 25 Aug. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

In an aspect, the present disclosure is directed to, among other things, palatable transponder device for admixing with a food product (e.g., food, food precursor, pet food products, snacks pieces, finished food products, livestock feed, or the like) including an encapsulant having one or more organoleptic attributes (e.g., appearance, aroma, color, softness, taste, texture, tenderness, or the like) that mimic the food product. In an embodiment, the palatable transponder device includes a food-attribute-identification circuit including one or more memory circuits having food-attribute data associated with a food product stored thereon. In an embodiment, the palatable transponder device includes an interrogation interface operably coupled to the food-attribute-identification circuit that provides food-attribute data in response to interrogation of the interrogation interface.

In an aspect, the present disclosure is directed to, among other things, a palatable transponder device including a substrate having an integrated circuit and an interrogation interface disposed thereon. In an embodiment, the substrate incorporates one or more organoleptic attributes (e.g., appearance, aroma, color, softness, taste, texture, tenderness, or the like) that mimic a food product.

In an aspect, the present disclosure is directed to, among other things, a method for making a palatable transponder including at least partially embedding an integrated circuit, including a food-attribute-identification circuit operably coupled to an interrogation interface, in an encapsulant having one or more organoleptic attributes that mimic the food product.

In an aspect, the present disclosure is directed to, among other things, a method for making a palatable transponder including at least partially embedding an integrated circuit, including an interrogation interface, in an elastomeric package configured to reduce human sensory feedback when the integrated circuit is in a human dental occlusion.

In an aspect, the present disclosure is directed to, among other things, an edible transponder device including a food-attribute-identification circuit disposed on an edible substrate. In an embodiment, the edible transponder device includes a first interrogation interface operably coupled to the food-attribute-identification circuit, and is configured to provide food-attribute data in response to interrogation of the first interrogation interface.

In an aspect, the present disclosure is directed to, among other things, a transponder device (e.g., a palatable transponder, an edible transponder, a palatable radio frequency identification (RFID) tag, an edible RFID tag, etc.) for admixing with a food product. In an embodiment, the transponder includes a food-attribute-identification circuit disposed (e.g., printed, affixed, etc.) on a substrate (e.g., a palatable substrate, an edible substrate, etc). In an embodiment, the transponder device includes a food-attribute-identification circuit having one or more memory circuits with food-attribute data stored thereon. In an embodiment, the transponder device includes an interrogation interface operably coupled to the food-attribute-identification circuit. In an embodiment, the food-attribute-identification circuit is configured to provide food-attribute data in response to interrogation of the interrogation interface.

In an aspect, the present disclosure is directed to, among other things, a multiplex food-attribute-identification transponder system including a plurality of micro-transponder sets. In an embodiment, each micro-transponder set includes at least one micro-transponder having a food-attribute-identification circuit including at least one physical data structure having food-attribute data stored thereon. In an embodiment, each micro-transponder set includes at least one micro-transponder having an interrogation-selective interface operably coupled to the food-attribute-identification circuit. In an embodiment, the interrogation-selective interface is operable to provide food-attribute data in response to electromagnetic interrogation of the interrogation-selective interface that satisfies interrogation-selective criteria. In an embodiment, at least one of the plurality of micro-transponder sets includes an interrogation-selective criteria different from another of the plurality of micro-transponder sets.

In an aspect, the present disclosure is directed to, among other things, an admixture of palatable transponders and a food product including a quantity of food product (e.g., food or food precursor) and a plurality of palatable transponders. In an embodiment, one or more of the plurality of palatable transponders includes an encapsulant including that reduces an ability of a person to discriminate between the palatable transponder and a food product. In an embodiment, one or more of the plurality of palatable transponders includes a substrate having one or more organoleptic attributes that mimic a food product. In an embodiment, one or more of the plurality of palatable transponders includes a substrate carrying an integrated circuit manufactured to reduce interactions with a human digestive tract. In an embodiment, the admixture of radio frequency identification tags and the food product is received within a food utensil having one or more structural elements that are substantially transparent to electromagnetic energy in the radio frequency range.

In an aspect, the present disclosure is directed to, among other things, food product including a substantially radio frequency transparent container. In an embodiment, the substantially radio frequency transparent container includes a quantity of food product and a plurality of palatable transponders received within. In an embodiment, the substantially radio frequency transparent container includes a quantity of food product and a plurality of edible transponders received within.

In an aspect, the present disclosure is directed to, among other things, an admixture of edible transponders and a food product including a quantity of food product (e.g., food or food precursor) and a plurality of edible transponders. In an embodiment, each of the plurality of edible transponders includes an interrogation interface, and a food-attribute-identification circuit operably coupled to the interrogation interface and disposed on the edible substrate. In an embodiment, the food-attribute-identification circuit includes one or more memory circuits having food-attribute data associated with the food product stored thereon.

In an aspect, the present disclosure is directed to, among other things, a multiplex food-attribute-identification transponder system including a plurality of micro-transponder sets. In an embodiment, each micro-transponder set includes at least one micro-transponder having a food-attribute-identification circuit including at least one physical data structure having food-attribute data stored thereon. In an embodiment, each micro-transponder set includes at least one micro-transponder having an interrogation-selective interface operably coupled to the food-attribute-identification circuit. In an embodiment, the interrogation-selective interface is operable to provide food-attribute data in response to electromagnetic interrogation of the interrogation-selective interface that satisfies interrogation-selective criteria. In an embodiment, at least one of the plurality of micro-transponder sets includes an interrogation-selective criteria different from another of the plurality of micro-transponder sets.

In an aspect, the present disclosure is directed to, among other things, a food product including a quantity of food product and a quantity of radio frequency identification tags in a stochastic distribution within the quantity of food product. In an embodiment, the radio frequency identification tags include a food-attribute-identification circuit having food-attribute data stored on one or more memory circuits.

In an aspect, the present disclosure is directed to, among other things, an attribute-identifying food product including a quantity of food product and a plurality of radio frequency identification tags. In an embodiment, a portion of the plurality of radio frequency identification tags includes a food-attribute-identification circuit including one or more physical data structures having food-attribute data indicative of at least one food attribute stored thereon. In an embodiment, a portion of the plurality of radio frequency identification tags includes an interrogation-selective interface operably coupled to the food-attribute-identification circuit.

In an aspect, the present disclosure is directed to, among other things, a food product including a plurality of food particles and at least one food-attribute-identification circuit including an interrogation interface and having food-attribute data stored on one or more memory circuits. In an embodiment, the food-attribute-identification circuit is coupled to one or more of the plurality of food particles.

In an aspect, the present disclosure is directed to, among other things, a radio frequency identification (RFID) tag including a food-attribute-identification circuit and at least one interrogation interface operably coupled to the food-attribute-identification circuit. In an embodiment, the food-attribute-identification circuit includes programmable storage having food-attribute data stored thereon. In an embodiment, the at least one interrogation interface is responsive to electromagnetic energy interrogation.

In an aspect, the present disclosure is directed to, among other things, a method of manufacturing an edible transponder device including writing food-attribute information (e.g., food-attribute data or the like) onto a memory circuit of an edible transponder device having an interrogation interface operatively coupled to the memory circuit. In an embodiment, the method includes writing structured data indicative of at least one food attribute onto the memory circuit.

In an aspect, the present disclosure is directed to, among other things, a method for making a radio frequency identification tag carried by a food product (e.g., food particles, food flakes, etc.) including physically coupling an integrated circuit including food-attribute-identification circuit having food-attribute data stored thereon and an interrogation interface onto an edible substrate.

In an aspect, the present disclosure is directed to, among other things, a radio frequency identification tag including a food-attribute-identification circuit and an interrogation interface on an integrated circuit die. In an embodiment, the food-attribute-identification circuit includes one or more memory circuits having food-attribute data stored thereon. In an embodiment, the radio frequency identification tag includes a resonant antenna formed on the integrated circuit die and operatively coupled to the interrogation interface. In an embodiment, the resonant antenna has a Quality factor (Q-factor) ranging from about 10 to about 1000.

In an aspect, the present disclosure is directed to, among other things, a radio frequency identification tag including a food-attribute-identification circuit including an interrogation interface on an integrated circuit die. In an embodiment, the food-attribute-identification circuit includes one or more memory circuits having food-attribute data stored thereon. In an embodiment, the radio frequency identification tag includes a resonant antenna formed on the integrated circuit die and operatively coupled to the interrogation interface. In an embodiment, the resonant antenna includes at least one of a food-attribute-specific resonance frequency or a food-attribute-specific inductance associated therewith. In an embodiment, the resonant antenna includes at least one of a resonance frequency, inductance, or resistance that varies when exposed to a food handling condition.

In an aspect, the present disclosure is directed to, among other things, a radio frequency identification tag configured to track food including a resonant antenna configured for sensitivity at a frequency range that is a function of an adjacent food permittivity. In an embodiment, the radio frequency identification tag includes an antenna tuning circuit coupled to the resonant antenna, and a logic circuit operatively coupled to the tuning circuit. In an embodiment, the logic circuit is configured to switch at least one of inductance or resistance of the tuning circuit. In an embodiment, the radio frequency identification tag includes an interrogation interface configured to receive a command for the logic circuit to switch one or more of the inductance or resistance of the tuning circuit.

In an aspect, the present disclosure is directed to, among other things, a passive radio frequency identification tag configured to track food including a first antenna interface operable to draw power from an interrogation field and a second antenna interface operable to cause backscatter or forward scatter. In an embodiment, the passive radio frequency identification tag includes a logic and memory circuit operatively that is coupled so as to draw power from the first antenna interface and communicate across the second antenna interface.

In an aspect, the present disclosure is directed to, among other things, an edible transponder device including a substrate coupled to an integrated circuit having an interrogation interface. In an embodiment, the substrate includes a material having an attribute that reduces the ability of a person to discriminate between the edible transponder and a food product.

In an aspect, the present disclosure is directed to, among other things, an edible transponder device including a substrate carrying an integrated circuit manufactured to reduce interactions with a human digestive tract. In an embodiment, the edible transponder device includes a delivery system including an edible carrier operatively coupled to the substrate and configured to deliver the substrate holding the integrated circuit to the human digestive tract.

In an aspect, the present disclosure is directed to, among other things, a method for making an edible transponder including at least partially embedding an integrated circuit, including an interrogation interface, in an elastomeric package configured to reduce human sensory feedback when the integrated circuit is in a human dental occlusion.

In an aspect, the present disclosure is directed to, among other things, a method for making a radio frequency identification tag carried by food particles including physically coupling a food-attribute-identification circuit including an interrogation interface onto an edible substrate.

In an aspect, the present disclosure is directed to, among other things, an apparatus for embedding radio frequency identification tags in a food product including a data source configured to provide data corresponding to a food attribute of a food product. In an embodiment, the apparatus for embedding radio frequency identification tags includes a tag-count controller configured to determine at least an approximate number of radio frequency identification tags for insertion into the food product based on a measured food attribute. In an embodiment, the apparatus for embedding radio frequency identification tags includes an actuator operatively coupled to the tag-count controller and configured to cause the insertion of the at least approximate number of radio frequency identification tags into the food product.

In an aspect, the present disclosure is directed to, among other things, an apparatus for embedding radio frequency identification tags in a food product including a sensor component including one or more sensors that measure a food attribute of a food product. In an embodiment, the apparatus for embedding radio frequency identification tags includes a tag-count controller configured to determine at least an approximate number of radio frequency identification tags for insertion into the food product based on a measured food attribute. In an embodiment, the apparatus for embedding radio frequency identification tags includes an actuator operatively coupled to the tag-count controller and configured to cause the insertion of the at least approximate number of radio frequency identification tags into the food product.

In an aspect, the present disclosure is directed to, among other things, a method including combining a first quantity of radio frequency identification tags with a second quantity of food product in a stochastic distribution.

In an aspect, the present disclosure is directed to, among other things, a system for mixing radio frequency identification tags into food including a dispenser controller configured to actuate insertion of radio frequency identification tags into a food product. In an embodiment, the system includes a food-tag interrogator configured to output commands to the radio frequency identification tags to change a response frequency of one or more antennas, while the radio frequency identification tags are suspended in the food product.

In an aspect, the present disclosure is directed to, among other things, a method for interrogating a plurality of multiplex micro-transponders including irradiating an interrogation field with a first radio frequency stimulus of a character and for a duration sufficient to power at least a portion of a plurality of multiplex micro-transponders. In an embodiment, the method for interrogating a plurality of multiplex micro-transponders includes interrogating the interrogation field with at least one of a first food-attribute-specific frequency or a first food-attribute-specific carrier waveform of a character and for a duration sufficient to communicate with a first set of the plurality of multiplex micro-transponders in the interrogation field.

In an aspect, the present disclosure is directed to, among other things, an admixture of transponders and a food product including a quantity of food product and a plurality of micro-transponder sets. In an embodiment, each micro-transponder set includes at least one micro-transponder having a food-attribute-identification circuit including at least one physical data structure having food-attribute data stored thereon. In an embodiment, each micro-transponder set includes an interrogation-selective interface operably coupled to the food-attribute-identification circuit. In an embodiment, the interrogation-selective interface is operable to provide food-attribute data in response to electromagnetic interrogation of the interrogation-selective interface that satisfies interrogation-selective criteria. In an embodiment, at least one of the plurality of micro-transponder sets includes interrogation-selective criteria different from another of the plurality of micro-transponder sets.

In an aspect, the present disclosure is directed to, among other things, a system including an electromagnetic energy generation circuit that elicits food-attribute data in response to electromagnetic energy interrogation of at least one radio frequency identification tag carried within a volume of a food product. In an embodiment, the system includes a food-attribute-identification circuit that compares elicited food-attribute data to food-attribute filtering data, and activates at least one protocol associated with an adverse response to food. In an embodiment, the food-attribute-identification circuit activates at least one of an allergen alerting protocol, a food-attribute-identification protocol, or a code generation protocol based on the comparison. In an embodiment, the food-attribute-identification circuit activates at least one of a food metabolite content protocol, food metabolite response protocol, or a food metabolite alerting protocol.

In an aspect, the present disclosure is directed to, among other things, a food utensil including at least one antenna configured to interrogate radio frequency identification tags in a volume of food product, and a food attribute interrogator controller operatively coupled to the at least one antenna and configured to indicate the presence of one or more instances of data indicative of at least one food attribute.

In an aspect, the present disclosure is directed to, among other things, a method for monitoring food intake including receiving data from an admixture of radio frequency identification tags and a food product interrogated by a radio frequency interrogator, the data corresponding to one or more food attributes associated with the food product. In an embodiment, the method includes outputting an indication associated with one or more attributes of the food product based on a comparison between received data from the radio frequency identification tags and filtering information In an aspect, the present disclosure is directed to, among other things, a food utensil including a body structure configured as a food consumption implement and at least one antenna embedded in, formed on, or intrinsic with the body structure. In an embodiment, the at least one antenna is configured to interrogate one or more radio frequency identification tags within a volume of food product proximate the food consumption implement.

In an aspect, the present disclosure is directed to, among other things, a method for interrogating radio frequency identification tags including irradiating an admixture of radio frequency identification tags and a food product with a first radio frequency of a character and for a duration sufficient to power a radio frequency identification tag. In an embodiment, the method for interrogating radio frequency identification tags includes interrogating The admixture of radio frequency identification tags and the food product with a second radio frequency of a character and for a duration sufficient to communicate with one or more radio frequency identification tags within the interrogation field.

In an aspect, the present disclosure is directed to, among other things, a system including a bistatic food-tag-interrogation circuit configured to irradiate a volume of food product carrying a plurality of radio frequency identification tags with a radio interrogation beam, and to elicit a response from at least a portion of the plurality of radio frequency identification tags.

In an aspect, the present disclosure is directed to, among other things, a method for monitoring food including decoding data elicited by radio frequency interrogation of radio frequency identification tags within a volume of food product proximate a food consumption implement. In an embodiment, the method for monitoring food includes generating a response based on the data decoding. In an embodiment, the generated response is indicative of the one or more food attributes associated with the volume of food product proximate the food consumption implement. In an embodiment, the generated response includes at least one of a visual representation, an audio representation, a haptic representation, or a tactile representation indicative of one or more attributes or cumulative attributes associated with the volume of food product.

BRIEF DESCRIPTION OF THE FIGURES

FIG. 5 shows a flow diagram of a method according to one embodiment.

FIG. 6 shows a flow diagram of a method for making a radio frequency identification tag carried by food particles according to one embodiment.

FIG. 7 shows a flow diagram of a method according to one embodiment.

FIG. 9 shows a flow diagram of a method for monitoring food intake according to one embodiment.

FIG. 10 shows a flow diagram of a method for interrogating radio frequency identification tags according to one embodiment.

FIG. 11 shows a flow diagram of a method for monitoring food according to one embodiment.

FIG. 12 shows a flow diagram of a method according to one embodiment.

FIG. 13 shows a flow diagram of a method for making a radio frequency identification tag to track food according to one embodiment.

FIG. 14 shows a flow diagram of a method of manufacturing an edible transponder device according to one embodiment.

FIG. 15 shows a flow diagram of a method for making a palatable transponder according to one embodiment.

FIG. 16 shows a flow diagram of a method for making a palatable transponder according to one embodiment.

DETAILED DESCRIPTION

Figure 1:
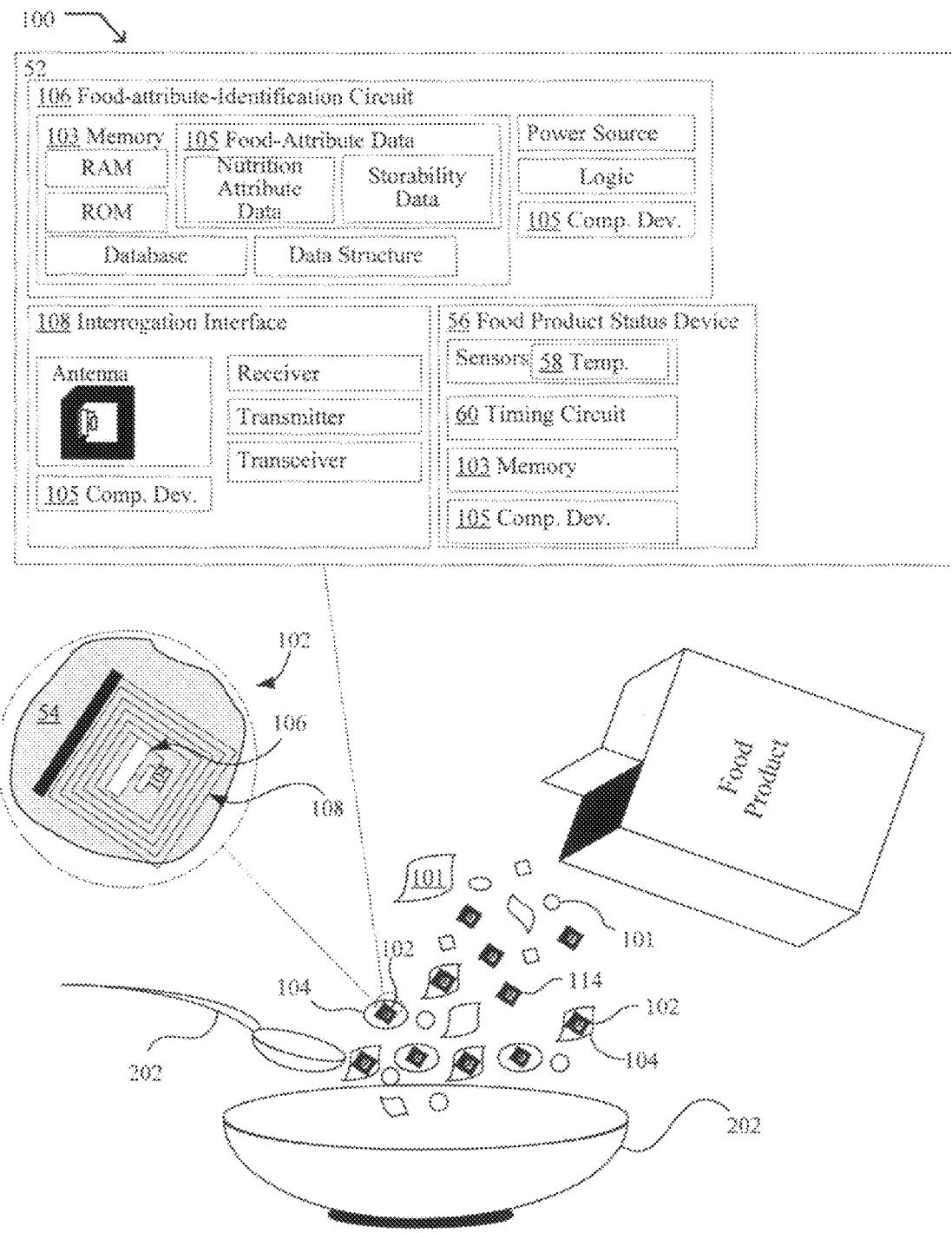
FIG. 1 is a perspective view of a system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 shows a system 100 including an palatable transponder device 52, in which one or more methodologies or technologies can be implemented such as, for example, manufacturing a palatable transponder device 52 for admixing with a food product, manufacturing a palatable transponder device 52 that generates at least one of an expiration date, provides food-attribute data, determines a food condition, mitigates a conditions associated with an adverse food response, alerts a user of an adverse event associated with adverse food response, or the like. Non-limiting examples of palatable transponder devices 52 include palatable radio frequency identification (RFID) tags, palatable electronic tags, palatable Near Field Communication (NFC) enabled transponder devices, palatable receiver-transmitter devices, palatable transceiver devices, or the like. In an embodiment, the palatable transponder device 52 includes a food-attribute-identification circuit 106 having one or more memory circuits 103 with food-attribute data 105 stored thereon.

In an embodiment, the palatable transponder device 52 includes an interrogation interface 108 operably coupled to the food-attribute-identification circuit 106. In an embodiment, the food-attribute-identification circuit 106 provides food-attribute data 105 in response to interrogation of the interrogation interface 105. In an embodiment, the food-attribute-identification circuit 106 provides food-attribute data 105 associated with a food product forming part of an admixture of palatable transponder devices 52 and the food product.

Non-limiting examples of food-attribute data 105 includes one or more of food safety attribute data (e.g., contaminant data, drug residue data, food additive data, food-borne pathogen data, fumigation data, heavy metal content data, toxin content data, irradiation data, pesticide data, physical hazards data, preservative content data, spoilage data, etc.); nutrition attribute data (e.g., calories data, carbohydrate content data, cholesterol content data, fat content data, fiber content data, mineral content data, protein content data, sodium content data, vitamin content data, etc.); or the like. Further non-limiting examples of food-attribute data 105 include storability data (e.g., keepability data, compositional integrity data, expiration data, storage protocol data, etc.); process attribute data (e.g., authenticity of process data, place of origin data, biotechnology data, biochemistry data, organic certification data, environmental impact data, traceability data, worker safety data, etc.); or the like.

Further non-limiting examples of food-attribute data include data associated with adverse responses to food. Adverse responses to food include food allergies, food intolerances, toxin-mediated reactions, pharmacological reactions, etc. In some cases, the adverse response is uncomfortable but not severe. In other cases, it can be life-threatening. Food allergy affects an estimated 6 to 8 percent of children under age 5, and about 3 to 4 percent of adults. Food allergy symptoms usually develop within a few minutes to two hours after eating the offending food. Further non-limiting examples of food-attribute data include food attribute content data, food attribute level data, food safety attribute data, nutrition attribute data, storability data, process attribute data, advertising data, brand data, country of origin data, distributer data, manufacturer data, packaging data, warranty data, or the like. Further non-limiting examples of food-attribute data include coupon data, rebate data, or sweepstake data, enterprise specific data, or the like.

Non-limiting examples of food products known to cause allergic reactions in people with food allergies include crustacean shellfish eggs, fish, milk, peanuts, proteins, soybeans, tree nuts (e.g., almonds, pecans, walnuts, etc.), wheat, or the like. Non-limiting examples of food products known to cause adverse reactions include those having one or more of citric acid, fructose, gluten, lactose, salicylate, sodium phosphates, sucrose, or the like. Non-limiting examples of metabolites in food products include carbohydrates (e.g., fructose, glucose, galactose, sucrose, starch, gluten, etc.), fats (e.g., fatty acids, etc.), lipids (e.g., glycerol, triglyceride, etc.), proteins (amino acids, etc.), ammonia, or the like.

In an embodiment, the palatable transponder device 52 is configured for admixing with a food product. For example, in an embodiment, the palatable transponder device 52 includes an encapsulant 54 having one or more organoleptic attributes (e.g., appearance, aroma, color, softness, taste, texture, tenderness, or the like) that mimic the food product. In an embodiment, the palatable transponder device 52 includes one or more organoleptic attributes that reduces an ability of a person to discriminate between the palatable transponder and a food product to be admix with a plurality of palatable transponder devices 52. In an embodiment, an admixture of palatable transponder devices 52 and food product includes a quantity of palatable transponder devices 52 that is proportional to a food attribute content amount. In an embodiment, an admixture of palatable transponder devices 52 and food product includes a quantity of palatable transponder devices 52 whose collective response upon interrogation is proportional to a food attribute amount. In an embodiment, an admixture of palatable transponder devices 52 and food product includes a quantity of palatable transponder devices 52 whose response upon interrogation is indicative of a food attribute amount.

In an embodiment, the encapsulant 54 includes at least one of a color, density, flavor, scent, or texture that reduces the ability of a person to discriminate between the palatable transponder device 52 and the food product. For example, in an embodiment, the encapsulant 54 includes one or more pigments that mimic a color associated with the food product. In an embodiment, the encapsulant 54 includes one or more binders, fillers, gelling agents, plasticizers, stabilizers, suspending agents, or thickeners that mimic a density associated with the food product. In an embodiment, the encapsulant 54 includes one or more flavorants that mimic a taste associated with the food product. In an embodiment, the encapsulant 54 includes one or more aromatizers that mimic a scent associated with the food product. In an embodiment, the encapsulant 54 includes one or more texturizers that mimic a texture associated with the food product.

In an embodiment, the encapsulant 54 includes one or more surface-finishing agents. In an embodiment, the encapsulant 54 includes an edible material. In an embodiment, the encapsulant 54 includes one or more food particles associated with the food product. In an embodiment, the encapsulant 54 includes an elastomer that reduces human sensory feedback when the palatable transponder device 52 is in a human dental occlusion. In an embodiment, the encapsulant 54 includes an elastomer configured to reduce human sensory feedback when the integrated circuit is in a human dental occlusion. In an embodiment, the encapsulant 54 is manufactured to include chamfered or rounded edges having a profile configured to reduce an incidence rate of abrasion, cutting, or lodging in the human digestive tract.

In an embodiment, the palatable transponder device 52 includes an edible interrogation interface 108. For example, in an embodiment, the palatable transponder device 52 includes at least one of an edible antenna, an edible wire antenna, an antenna printed on an edible substrate 104, or an antenna printed with edible conductive ink. In an embodiment, the interrogation interface 108 includes an antenna disposed on a chewable substrate suitable for human consumption. In an embodiment, the interrogation interface 108 includes an antenna having a rigidity that is substantially the same as that of the food product. In an embodiment, the interrogation interface 108 includes an antenna having a deformability that is substantially the same as that of the food product.

In an embodiment, the interrogation interface 108 includes an antenna having a cross-section on the order of tens of micrometers. In an embodiment, the interrogation interface 108 includes an antenna having a cross-section on the order of hundreds of micrometers. In an embodiment, the interrogation interface 108 includes an antenna having a cross-section ranging from about tens of micrometers to about hundreds of micrometers.

In an embodiment, the palatable transponder device 52 is self-tuning. For example, in an embodiment, the palatable transponder device 52 includes one or more tunable transistors to self-correct for changes in temperature. In an embodiment, the palatable transponder device 52 includes one or more tunable transistors to self-correct for dielectric changes in an environment. In an embodiment, the palatable transponder device 52 is configured to self-tune to compensate for quality factor (Q-factor) changes of the interrogation interface 108 resulting from admixing the palatable transponder device 52 with the food product. In an embodiment, the palatable transponder device 52 is configured to self-tune to compensate for environmental effects. In an embodiment, the palatable transponder device 52 is configured to self-tune to compensate for encapsulant 54 material effects.

In an embodiment, the palatable transponder device 52 includes a food product status device 56 that monitors at least one status condition associated with the food product. In an embodiment, the food product status device 56 is operably coupled to at least one of the food-attribute-identification circuit 106 or the interrogation interface 108. In an embodiment, the food product status device 56 includes a temperature sensor 58 for measuring a temperature associated with the food product and at least one memory circuit 103 to store temperature measurand information. In an embodiment, the food product status device 56 is configured to provide temperature measurand information in response to interrogation of the interrogation interface 108. In an embodiment, the food product status device 56 is configured to provide one of a phase-locked response or a time-locked response indicative of a food-attribute in response to interrogation of the interrogation interface.

In an embodiment, the food product status device 56 includes a programmable timing circuit 60 that generates food product time event data and at least one memory circuit 103 to store food product time event data. In an embodiment, the programmable timing circuit 60 generates at least one of expiration date data, food product expiration data, freshness date data, remaining shelf life data, suitable for consumption date data, suitable for sale date data, suitable for sale date data, unsuitable for consumption date data, or unsuitable for sale date data. In an embodiment, the food product status device 56 is configured to provide food product time event data in response to interrogation of the interrogation interface.

In an embodiment, the food product status device 56 is configured to provide food product time event data when the food product time event data satisfies a target criterion. In an embodiment, the food product status device 56 is configured to provide food product time event data when the food product time event data meet or exceeds a target value. In an embodiment, the food product status device 56 is configured to provide food product time event data when the food product time event data meet or exceeds a target time interval.

In an embodiment, the palatable transponder device 52 includes a substrate 104 having one or more organoleptic attributes that mimic the food product and including at least one of the food-attribute-identification circuit 106 or the interrogation interface 108 disposed thereon, the substrate having one or more organoleptic attributes that mimic the food product. For example, in an embodiment, the substrate 104 includes a material that mimics a color associated with the food product. In an embodiment, the substrate 104 includes a material that mimics density associated with the food product. In an embodiment, the substrate 104 includes a material that mimics a flavor associated with the food product. In an embodiment, the substrate 104 includes a material that mimics a scent associated with the food. In an embodiment, the substrate 104 includes a material that mimics a texture associated with the food.

In an embodiment, the substrate 104 includes a material having at least one of a color, density, flavor, scent, or texture that reduces the ability of a person to discriminate between the palatable transponder device 52 and the food product. In an embodiment, the palatable transponder device 52 includes a substrate having an integrated circuit and an interrogation interface 108 disposed thereon, the substrate having one or more organoleptic attributes (e.g., appearance, aroma, color, softness, taste, texture, tenderness, or the like) that mimic a food product.

In an embodiment, the substrate 104 is manufactured to reduce interactions with a human digestive tract. For example, in an embodiment, the substrate 104 is manufactured to include chamfered or rounded edges having a profile configured to reduce an incidence rate of abrasion, cutting, or lodging in the human digestive tract. In an embodiment, the substrate 104 is manufactured to include chamfered or rounded edges having a profile configured to reduce an incidence rate of abrasion, cutting, or lodging in the human digestive tract. In an embodiment, the substrate 104 includes an elastomer that reduces human sensory feedback when the palatable transponder device 52 is in a human dental occlusion. In an embodiment, the substrate 104 includes an elastomer configured to reduce human sensory feedback when the integrated circuit is in a human dental occlusion.

In an embodiment, the substrate 104 includes one or more organoleptic attributes that reduces an ability of a person to discriminate between the palatable transponder and the food product. For example, in an embodiment, the substrate 104 includes one or more pigments that mimic a color associated with the food product. In an embodiment, the substrate 104 includes one or more binders, fillers, gelling agents, plasticizers, stabilizers, suspending agents, or thickeners that mimics a density associated with the food product. In an embodiment, the substrate 104 includes one or more flavorants that mimic a flavor associated with the food product. In an embodiment, the substrate 104 includes one or more aromatizers that mimic a scent associated with the food product. In an embodiment, the substrate 104 includes one or more texturizers that mimic a texture associated with the food product.

In an embodiment, the substrate 104 includes one or more surface-finishing agents. In an embodiment, the substrate 104 includes an edible material. In an embodiment, the substrate 104 includes one or more food particles associated with the food product. In an embodiment, the substrate 104 comprises at least one of a color, density, flavor, scent, or texture that reduces the ability of a person to discriminate between the palatable transponder device 52 and the food product. In an embodiment, the palatable transponder device 52 includes an elastomeric package in which the substrate is at least partially embedded. In an embodiment, the elastomeric package includes one or more materials that reduce human sensory feedback when the palatable transponder device 52 is in a human dental occlusion.

In an embodiment, the palatable transponder device 52 includes a substrate 104 carrying an integrated circuit manufactured to reduce interactions with a human digestive tract. In an embodiment, the substrate 104 is manufactured to include chamfered or rounded edges having a profile configured to reduce an incidence rate of abrasion, cutting, or lodging in the human digestive tract. In an embodiment, the substrate 104 is manufactured to include circuit materials that are adapted for human consumption. In an embodiment, the substrate 104 is manufactured to include circuit materials having break-down products that are adapted for human consumption. In an embodiment, the substrate 104 is manufactured to include an encapsulant 54 that reduces exposure of the substrate 104 and integrated circuit to the human digestive tract environment. In an embodiment, the substrate 104 includes a die from a substrate wafer.

In an embodiment, the palatable transponder device 52 includes a delivery system including an edible carrier operatively coupled to the substrate and configured to deliver the substrate to the human digestive tract. In an embodiment, the edible carrier includes a food product.

In an embodiment, palatable resonate element includes an interrogation interface 108 having a food-attribute specific. In an embodiment, the palatable resonate element includes a resonant antenna having at least one of a food-attribute-specific resonance frequency; a food-attribute-specific inductance, or a food-attribute-specific resistance associated therewith. In an embodiment, the palatable resonate element includes a resonant antenna having an electromagnetic energy selective interrogation interface that is responsive to an allergen-specific carrier waveform.

Figure 2:
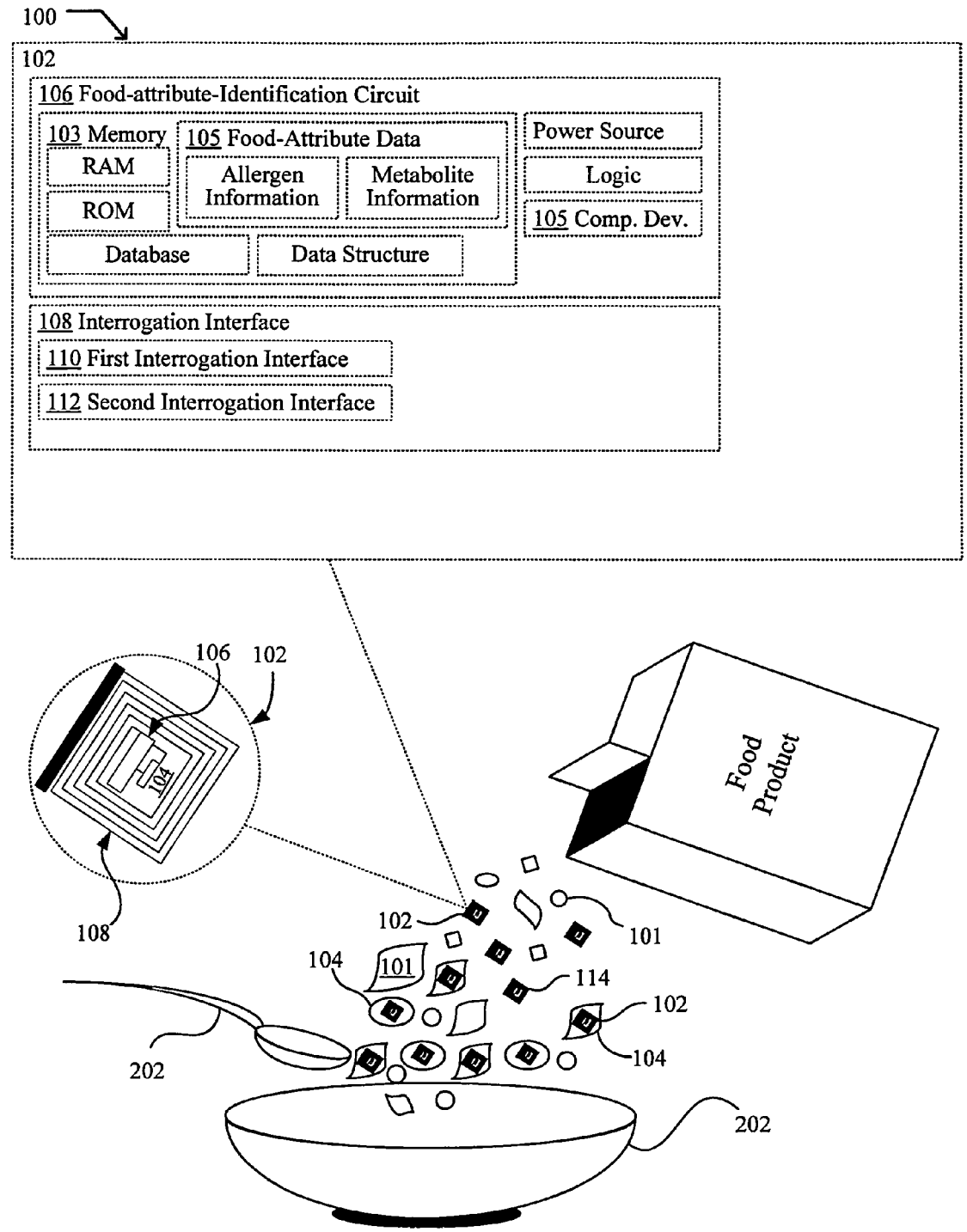
FIG. 2 is a perspective view of a system according to one embodiment.

FIG. 2 shows a system 100 including an edible transponder device 102, in which one or more methodologies or technologies can be implemented such as, for example, monitoring food intake, determining a food condition, mitigating conditions associated with an adverse food response, alerting a user of an adverse event associated with adverse food response, or the like. Non-limiting examples of transponder devices 102 include radio frequency identification (RFID) tags, electronic tags, Near Field Communication (NFC) enabled transponder devices, receiver-transmitter devices, transceiver devices, or the like.

In an embodiment, the edible transponder device 102 includes an edible substrate 104. In an embodiment, the edible substrate 104 includes one or more of biodegradable films, edible adhesive polymers, thermoplastic polyesters, water-soluble edible polymeric materials, food products 101, or the like. Further non-limiting examples of edible substrate materials include sugar (e.g., caramelized sugar, etc.), celluloses, cereal proteins, maize, soy (e.g., soy proteins, soy fibers, soybeans, degradable soybean materials, etc.), starches, or the like. Further non-limiting examples of edible substrates 104 includes substrates fabricated with materials suitable for consumption that are capable of having a circuit disposed on them. Further non-limiting examples of edible substrates 104 include pet food products, snacks pieces, finished food products, livestock feed, or the like. In an embodiment, the edible substrate 104 includes silica. In an embodiment, the edible substrate 104 includes a biodegradable film. In an embodiment, the edible substrate 104 includes a food product. In an embodiment, the edible substrate 104 includes one or more Generally Recognized As Safe (GRAS) substances. See e.g., GRAS Notice Inventory (http://www.accessdata.fda.gov/scripts/fcn/fcnNavigation.cfm?rpt=grasListing). In an embodiment, the edible substrate 104 includes poly(L-lactid-co-glycolide). See e.g., U.S. Pat. No. 7,873,122 (issued Jan. 18, 2011); which is incorporated herein by reference.

In an embodiment, the edible transponder device 102 includes a food-attribute-identification circuit 106 disposed on the edible substrate 104. For example, in an embodiment, the food-attribute-identification circuit 106 is disposed on a silica substrate. In an embodiment, the food-attribute-identification circuit 106 is printed on the edible substrate. In an embodiment, the food-attribute-identification circuit 106 is printed on the edible substrate using edible conductive ink. In an embodiment, the food-attribute-identification circuit 106 is attached to the edible substrate using an edible adhesive.

In an embodiment, the edible transponder device 102 includes a food-attribute-identification circuit 106 including one or more memory circuits 103 that, for example, store instructions or data. Non-limiting examples of one or more memory circuits 103 include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of one or more memories include Erasable Programmable Read-Only Memory (EPROM), flash memory, or the like. The one or more memories can be coupled to, for example, one or more computing devices 105 by one or more instructions, data, or power buses.

In an embodiment, the food-attribute-identification circuit 106 includes one or more memory circuits 103 having food-attribute data stored thereon. Non-limiting examples of food-attribute data include allergen information (e.g., allergen content, an allergen response protocol, an allergen alerting protocol, etc.) metabolite information (e.g., food metabolite data, food metabolite content, food metabolite response protocol, food metabolite alerting protocol, etc.), adverse responses to food, or the like.

In an embodiment, the food-attribute-identification circuit 106 includes one or more memory circuits 103 having food-attribute data indicative of an adverse response to food stored thereon. For example, in an embodiment, the food-attribute-identification circuit 106 includes one or more memory circuits 103 having food-attribute data indicative of at least one of an allergen content, an allergen response protocol, or an allergen alerting protocol stored thereon. In an embodiment, the food-attribute-identification circuit 106 includes one or more memory circuits 103 having food-attribute data indicative of at least one of a metabolite content, a metabolite response protocol, or a metabolite alerting protocol stored thereon.

In an embodiment, the food-attribute-identification circuit 106 includes programmable storage having food-attribute data stored thereon. For example, in an embodiment, the food-attribute-identification circuit 106 includes at least one programmable memory circuit 107 having food-attribute data indicative of at least one of an allergen content, an allergen response protocol, an allergen alerting protocol, a metabolite content, a metabolite response protocol, or a metabolite alerting protocol stored thereon. In an embodiment, the food-attribute-identification circuit 106 includes a logic control circuit that generates a response indicative of at least one of an allergen content, an allergen response protocol, an allergen alerting protocol, a metabolite content, a metabolite response protocol, or a metabolite alerting protocol in response to interrogation of the first interrogation interface. In an embodiment, the food-attribute-identification circuit 106 includes at least one read-only memory circuit having food-attribute data stored thereon.

In an embodiment, the food-attribute-identification circuit 106 includes one or more physical data having food-attribute data stored thereon. In an embodiment, the food-attribute-identification circuit 106 includes food source data (e.g., eggs, fish, milk, peanuts, shellfish, soybeans, tree nuts, wheat, etc.). In an embodiment, the food-attribute-identification circuit 106 includes allergic reaction symptom data.

In an embodiment, the food-attribute-identification circuit 106 includes circuitry having one or more components operably coupled (e.g., communicatively, electromagnetically, magnetically, ultrasonically, optically, inductively, electrically, capacitively coupled, or the like) to each other. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), or the like, or any combinations thereof, and can include discrete digital or analog circuit elements or electronics, or combinations thereof. In an embodiment, circuitry includes one or more ASICs having a plurality of predefined logic components. In an embodiment, circuitry includes one or more FPGA having a plurality of programmable logic components.

In an embodiment, circuitry includes one or more memory circuits 103 that, for example, store instructions or data. Non-limiting examples of one or more memory circuits 103 include volatile memory (e.g., Random Access Memory (RAM) 136, Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of one or more memory circuits 103 include Erasable Programmable Read-Only Memory (EPROM), flash memory, or the like. The one or more memory circuits 103 can be coupled to, for example, one or more computing devices by one or more instructions, data, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operably coupled to at least one computing device to control (electrical, electromechanical, software-implemented, firmware-implemented, or other control, or combinations thereof) at least one parameter associated with, for example, generating a response indicative of at least one of an allergen content, an allergen response protocol, an allergen alerting protocol, a metabolite content, a metabolite response protocol, or a metabolite alerting protocol in response to interrogation of an interrogation interface 108 of the edible transponder device 102.

In an embodiment, the food-attribute-identification circuit 106 includes one or more memory circuits 103 having structured data indicative of a food-attribute stored thereon. In an embodiment, the food-attribute-identification circuit 106 includes one or more memory circuits 103 having structured data indicative of one or more protocols associated with an adverse response to food. For example, in an embodiment, the food-attribute-identification circuit 106 includes one or more memory circuits 103 having structured data indicative of at least one of an allergen content, an allergen response protocol, or an allergen alerting protocol. In an embodiment, the food-attribute-identification circuit 106 includes a logic control circuit. In an embodiment, the food-attribute-identification circuit 106 includes a power generation and management circuit. In an embodiment, the food-attribute-identification circuit 106 includes a demodulator circuit. In an embodiment, the food-attribute-identification circuit 106 a modulator circuit. In an embodiment, the food-attribute-identification circuit 106 an envelope detector circuit.

In an embodiment, the food-attribute-identification circuit 106 and the first interrogation interface 110 form part of an integrated circuit die. In an embodiment, the food-attribute-identification circuit 106 and the first interrogation interface 110 form part of an integrated circuit die having a major dimension of less than about 0.5 millimeters. In an embodiment, the food-attribute-identification circuit 106 and the first interrogation interface 110 form part of an integrated circuit die having a major dimension of less than about 0.4 millimeters. In an embodiment, the food-attribute-identification circuit 106 and the first interrogation interface 110 form part of an integrated circuit die having a major dimension of less than about 0.1 millimeters. In an embodiment, the food-attribute-identification circuit 106 and the first interrogation interface 110 form part of an integrated circuit die having a volume ranging from about 0.01 $cm^3$ to about 1 $cm^3$. In an embodiment, the food-attribute-identification circuit 106 and the first interrogation interface 110 form part of an integrated circuit die area or a volume no larger than that of food particle forming part of an admixture of food product and edible transponder devices 102.

In an embodiment, the edible transponder device 102 includes at least one interrogation interface 108. For example, in an embodiment, edible transponder device 102 includes an antenna. In an embodiment, the edible transponder device 102 includes at least one bistatic antenna. In an embodiment, the interrogation interface 108 includes one or more conductive traces (e.g., antenna coils). In an embodiment, the edible transponder device 102 includes a first interrogation interface 110 operably coupled to the food-attribute-identification circuit 106. In an embodiment, the first interrogation interface 110 is responsive to electromagnetic energy interrogation. For example, in an embodiment, the food-attribute-identification circuit 106 provides food-attribute data in response to interrogation of the first interrogation interface 110. In an embodiment, the food-attribute-identification circuit 106 is operably coupled to the first interrogation interface 110 via at least one interconnect.

In an embodiment, the edible transponder device 102 includes at least one interrogation interface 108 that is operable to transferred food-attribute data and an interrogator (e.g., reader, transceiver, etc.). For example, in an embodiment, food-attribute data is transferred between the edible transponder device 102 and a reader via low-power radio frequency waves. In an embodiment, during operation, a transceiver sends a signal to the edible transponder device 102, causing the transponder device 102 to transmit its information to the transceiver. The transceiver then reads the signal, converts it to a digital format, and transmits it to a designated application such as a user-specific response system (e.g., emergency response system, an alert system, etc.).

In an embodiment, the food-attribute-identification circuit 106 communicates with an interrogator device via the interrogation interface 108. In an embodiment, the food-attribute-identification circuit 106 toggles between a transmit state and a receive state upon electromagnetic energy interrogation. In an embodiment, the food-attribute-identification circuit 106 receives food-attribute data via the interrogation interface 108. In an embodiment, the food-attribute-identification circuit 106 and the interrogation interface 108 are adapted to emit electromagnetic energy in the radio frequency range.

In an embodiment, the food-attribute-identification circuit 106 communicates with an interrogator device via the interrogation interface 108 upon receipt of an authorization key. In an embodiment, the food-attribute-identification circuit 106 communicates with an interrogator device via the interrogation interface 108 upon receipt of an enterprise authorization key. In an embodiment, the edible transponder device 102 toggles between a transmit state and a receive state upon receipt of an authorization key. In an embodiment, the edible transponder device 102 toggles between a transmit state and a receive state upon receipt of an enterprise authorization key.

In an embodiment, the interrogation interface 108 includes an antenna that is responsive based on an allergen-specific criterion. For example, in an embodiment, the interrogation interface 108 includes an antenna that response to electromagnetic energy interrogation having a waveform that corresponds to an allergen-specific assignment. In an embodiment, the interrogation interface 108 includes a carrier waveform selective interrogation interface. In an embodiment, the interrogation interface 108 includes a frequency selective interrogation interface. In an embodiment, the interrogation interface 108 includes an electromagnetic energy selective interrogation interface. In an embodiment, the interrogation interface 108 is responsive to an allergen-specific carrier waveform. In an embodiment, the interrogation interface 108 is responsive to an allergen-specific frequency. In an embodiment, the interrogation interface 108 is responsive based on a message authentication protocol. In an embodiment, a major dimension of the edible transponder device 102 is less than about 0.5 millimeters. In an embodiment, a major dimension of the edible transponder device 102 is less than about 0.4 millimeters.

In an embodiment, the edible transponder device 102 includes a second interrogation interface 112. In an embodiment, the second interrogation interface 112 includes an external antenna. In an embodiment, the second interrogation interface 112 includes an external antenna disposed on the edible substrate 104.

In an embodiment, the edible transponder device 102 takes the form of an active radio frequency identification tag. In an embodiment, the edible transponder device 102 takes the form of a semi-passive radio frequency identification tag. In an embodiment, the edible transponder device 102 takes the form of a passive radio frequency identification tag. In an embodiment, the edible transponder device 102 the form of an active, carrier-wave-selective, radio frequency identification tag. In an embodiment, the edible transponder device 102 takes the form of a semi-passive, carrier-wave-selective, radio frequency identification tag. In an embodiment, the edible transponder device 102 takes the form of a passive, carrier-wave-selective, radio frequency identification tag.

In an embodiment, the edible transponder device 102 takes the form of a radio frequency identification tag 114 including a food-attribute-identification circuit 106 and at least one interrogation interface 108 disposed (e.g., printed, affixed, etc.) on an edible substrate 104. In an embodiment, the radio frequency identification tag 114 includes a food-attribute-identification circuit 106; and at least one interrogation interface 108 operably coupled to the food-attribute-identification circuit 106 and disposed on the edible substrate 104.

In an embodiment, at least a portion of the radio frequency identification tag 114 includes an edible covering. In an embodiment, at least a portion of the radio frequency identification tag 114 is encapsulated within a food product. In an embodiment, the interrogation interface 108 transmits food-attribute data upon electromagnetic energy interrogation. In an embodiment, radio frequency identification tag 114 toggles between a transmit state and a receive state upon electromagnetic energy interrogation.

In an embodiment, a radio frequency identification tag 114, includes an integrated circuit die having a food-attribute-identification circuit 106 and an interrogation interface 108 thereon. In an embodiment, the food-attribute-identification circuit 106 on the integrated circuit die includes one or more memory circuits 103 having food-attribute data stored thereon.

In an embodiment, the radio frequency identification tag 114 includes a resonant antenna formed on the integrated circuit die and operatively coupled to the interrogation interface 108. In an embodiment, the resonant antenna has at least one of a food-attribute-specific resonance frequency; a food-attribute-specific inductance, or a food-attribute-specific resistance associated therewith. In an embodiment, the resonant antenna has at least one of a resonance frequency, inductance, or resistance that varies when exposed to a food handling condition. In an embodiment, the interrogation interface 108 on the integrated circuit die is operably coupled to a resonant antenna formed on the integrated circuit die. In an embodiment, the resonant antenna has a Quality factor (Q-factor) ranging from about 10 to about 1000.

In an embodiment, the edible transponder device 102 takes the form of a radio frequency identification tag 114 including an antenna configured for sensitivity at a frequency range that is a function of an adjacent food permittivity. In an embodiment, the edible transponder device 102 takes the form of a radio frequency identification tag 114 including an antenna configured to self-compensate for edible substrates 104 having different dielectric constants. See e.g., U.S. Pat. No. 7,055,754 (issued Jun. 6, 2006); which is incorporated herein by reference.

In an embodiment, the radio frequency identification tag 114 includes an antenna tuning circuit coupled to the resonant antenna and a logic circuit operatively coupled to the tuning circuit. In an embodiment, the logic circuit is configured to switch at least one of inductance or resistance of the tuning circuit. In an embodiment, the radio frequency identification tag 114 includes an interrogation interface 108 configured to receive a command for the logic circuit to switch one or more of the inductance or resistance of the tuning circuit. In an embodiment, a passive radio frequency identification tag includes a first antenna interface operable to draw power from an interrogation field; and a second antenna interface operable to cause backscatter or forward scatter. In an embodiment, a logic and memory circuit is operatively coupled to draw power from the first antenna interface and communicate across the second antenna interface.

In an embodiment, the edible transponder device 102 includes a substrate coupled to an integrated circuit having an interrogation interface 108. In an embodiment, the substrate includes a material having an attribute that reduces the ability of a person to discriminate between the edible transponder and a food product. For example, in an embodiment, the substrate includes an elastomeric package including one or more materials that reduce human sensory feedback when the edible transponder is in a human dental occlusion. In an embodiment, the substrate includes an elastomeric package, in which the integrated circuit is at least partially embedded. In an embodiment, the substrate includes a material having an attribute that reduces the ability of a person to visually discriminate between edible transponder device 102 and the food product. For example, in an embodiment, the substrate includes a material having color, texture, etc., that reduces the ability of a person to visually discriminate between the edible transponder device 102 and the food product.

In an embodiment, the edible transponder device 102 includes a substrate carrying an integrated circuit manufactured to reduce interactions with a human digestive tract. In an embodiment, the substrate is manufactured to include chamfered or rounded edges having a profile configured to reduce an incidence rate of abrasion, cutting, or lodging in the human digestive tract. In an embodiment, the substrate is manufactured to include circuit materials that are adapted for human consumption or to have break-down products that are adapted for human consumption. In an embodiment, the substrate is manufactured to include a encapsulant 54 that reduces or eliminates exposure of the substrate and integrated circuit to the human digestive tract environment. In an embodiment, the substrate includes a die from a substrate wafer.

In an embodiment, the edible transponder device 102 includes a delivery system including an edible carrier operatively coupled to the substrate and configured to deliver the substrate holding the integrated circuit to the human digestive tract. In an embodiment, the edible carrier includes an antenna substrate. In an embodiment, the edible carrier includes a food product.

In an embodiment, an edible resonate element includes an interrogation interface 108 having a food-attribute specific. In an embodiment, the edible resonate element includes a resonant antenna having at least one of a food-attribute-specific resonance frequency; a food-attribute-specific inductance, or a food-attribute-specific resistance associated therewith. In an embodiment, the edible resonate element includes a resonant antenna having an electromagnetic energy selective interrogation interface that is responsive to an allergen-specific carrier waveform.

In an embodiment, a radio frequency identification tag is configured to track food handling or consumption. For example, in an embodiment, a radio frequency identification tag configured to track a food handling or consumption includes an interrogation interface 108, and a food-attribute-identification circuit 106 including a memory array having one or more data elements associated with a food attribute. In an embodiment, the one or more data elements include a make or break conductive coupling that breaks contact responsive to exposure to one or more food handling, preparation, or consumption conditions. In an embodiment, the make or break conductive coupling includes one or more conductors that open conductive paths responsive to exposure to one or more food handling, preparation, or consumption conditions. In an embodiment, the make or break conductive coupling includes a conductive path having open configuration before exposure to food handling, preparation, or consumption, and closed configuration during or after food handling, preparation, or consumption. In an embodiment, the make or break conductive coupling includes one or more pairs of conductive pads, the conductive path configured to close a circuit between the respective one or more pairs of conductive pads responsive to exposure to one or more food handling, preparation, or consumption conditions.

In an embodiment, the radio frequency identification tag includes a food-attribute-identification circuit 106 and a decomposable interrogation interface. In an embodiment, the decomposable interrogation interface includes one or more portions, components, materials, etc., that decompose in response to exposure to a food handling, preparation, or consumption condition. For example, in an embodiment, at least a portion of the decomposable interrogation interface is disposed on a thermally degradable polymer substrate that decomposes in response to exposure to a cooking temperature environment. In an embodiment, at least a portion of the decomposable interrogation interface is disposed on a degradable fiber-based substrate (e.g., paper, etc.). In an embodiment, at least a portion of the decomposable interrogation interface is disposed on a water-soluble polymer substrate.

In an embodiment, at least a portion of the decomposable interrogation interface is disposed on a soy-based material substrate. In an embodiment, at least a portion of the decomposable interrogation interface is disposed on a protein-based material substrate. In an embodiment, at least a portion of the decomposable interrogation interface is affixed to a substrate with a degradable adhesive.

In an embodiment, at least a portion of the decomposable interrogation interface is disposed on a substrate that is controllably degradable when exposed to appropriate conditions. For example, in an embodiment, at least a portion of the decomposable interrogation interface is disposed on at least one of a bio-degradable substrate, a chemically-degradable substrate, photo-degradable substrate, or thermally degradable substrate. In an embodiment, at least a portion of the decomposable interrogation interface is disposed on a substrate that degrades upon exposure to degradation-selective radiation. In an embodiment, at least a portion of the decomposable interrogation interface is disposed on a substrate having one or more bio-, photo-, or thermal-oxidative degradation promoters. In an embodiment, at least a portion of the decomposable interrogation interface is disposed on a substrate including one more biodegradable, photodegradable, or thermal-oxidative degradable additives. In an embodiment, at least a portion of the decomposable interrogation interface is disposed on a substrate including Poly-$\gamma$-glutamic acid. In an embodiment, at least a portion of the decomposable interrogation interface is disposed on a substrate including one or more polymers dissolvable in bodily fluids.

In an embodiment, a radio frequency identification tag configured to track food handling or consumption includes a radio frequency interface a memory array having one or more data elements having a make or break conductive coupling that change state responsive to exposure to one or more food handling, preparation, or consumption conditions. For example, in an embodiment, the radio frequency identification tag includes a memory array having one or more data elements having a make or break conductive coupling that degrades via a thermal-oxidative mechanism when exposed to cooking temperatures.

In an embodiment, the make or break conductive coupling includes a conductor configured to make contact before exposure to food handling or consumption, and break contact during or after the food handling, preparation, or consumption. In an embodiment, the make or break conductive coupling includes one or more conductors that are configured to open a conductive path responsive to exposure to one or more food handling, preparation, or consumption conditions. In an embodiment, the make or break conductive coupling includes one or more conductors that are configured to decompose responsive to exposure to food handling, preparation, or consumption condition. In an embodiment, the make or break conductive coupling includes a conductive path that is open before exposure to food handling, preparation, or consumption, and is closed during or after food handling, preparation, or consumption.

In an embodiment, a radio frequency identification tag configured to track food includes an integrated circuit including an interrogation interface 108 and a substrate bonded to the integrated circuit. In an embodiment, the substrate is configured to change state during a food handling, preparation, or consumption condition.

In an embodiment, a radio frequency identification tag 114 includes a radio frequency identification tag circuit carried by a substrate that decomposes in a use environment. For example, in an embodiment, one or both of the substrate or a portion of the circuit is configured to erode, dissolve, or chemically react with a use environment to produce decomposition products. In an embodiment, at least a portion of the radio frequency identification tag 114 is disposed on one or more bio-degradable substrates, chemically-degradable substrates, photo-degradable substrates, or thermally degradable substrates.

In an embodiment, a radio frequency identification tag 114 includes an antenna having portions configured for enabling the tag to be selectively modified to adjust the receiver sensitivity of the radio frequency identification tag. In an embodiment, the receiver is initially sensitive to radio frequency signals transmitted at a first distance from the radio frequency identification tag and after an adjustment by modifying the portions configured to be modified, the receiver is sensitive to radio frequency signals transmitted at a second distance from the radio frequency identification tag that is less than one half the first distance.

In an embodiment, the radio frequency identification tag 114 includes an antenna electrically coupled to a radio frequency transceiver integrated circuit. In an embodiment, the radio frequency transceiver integrated circuit is disposed on an edible substrate 104. In an embodiment, the integrated circuit includes programmable storage adapted for storing a unique identification code. In an embodiment, a radio frequency identification tag 114 includes at least one antenna for receiving and transmitting radio frequency signals.

In an embodiment, a system for determining a food condition includes an antenna, a transceiver including a decoder, and an edible transponder device 102. In an embodiment, a system for determining a food condition includes a radio frequency interrogator configured to interrogate one or more radio frequency identification tags 114 carried by food and a controller operatively coupled to the radio frequency interrogator. In an embodiment, the controller is configured to decode data from the one or more radio frequency identification tags 114 and to determine one or more food conditions corresponding to the data.

In an embodiment, a multiplex food-attribute-identification transponder system includes a plurality of micro-transponder sets. In an embodiment, each micro-transponder set includes at least one micro-transponder having a food-attribute-identification circuit 106 including at least one physical data structure having food-attribute data stored thereon. In an embodiment, at least one micro-transponder set of the plurality of micro-transponder sets includes an interrogation-selective criteria different from another of the plurality of micro-transponder sets. For example, in an embodiment, the food-attribute-identification circuit 106 determines a response state of the plurality of micro-transponder sets at two or more interrogation frequencies.

In an embodiment, the plurality of micro-transponder sets include at least a first micro-transponder set and a second micro-transponder set. In an embodiment, the first micro-transponder set including a food-attribute-identification circuit 106 having food-attribute data associated with a first ingredient, and the second micro-transponder set including a food-attribute-identification circuit including food-attribute data associated with a second ingredient.

In an embodiment, each micro-transponder set includes one or more interrogation-selective interfaces operably coupled to respective food-attribute-identification circuits 106. In an embodiment, the interrogation-selective interface includes at least one of an electromagnetic energy selective antenna, a frequency selective antenna, or a carrier waveform selective interrogation interface. In an embodiment, the interrogation-selective interface operable to provide food-attribute data in response to electromagnetic interrogation of the interrogation-selective interface that satisfies interrogation-selective criteria. For example, in an embodiment, the interrogation-selective interface provides an electromagnetic signal corresponding to a distinct food-attribute upon interrogation. In an embodiment, the interrogation-selective interface provides an electromagnetic energy signal corresponding to an allergen-specific multi-bit code upon interrogation. In an embodiment, the interrogation-selective criteria include a food-attribute-specific frequency. In an embodiment, the interrogation-selective criteria include a food-attribute-specific carrier waveform. In an embodiment, the interrogation-selective criteria include at least one of an allergen-specific frequency or an allergen-specific carrier waveform. In an embodiment, the interrogation-selective interrogation interface 108 generates a response signal corresponding to allergen-specific data responsive to interrogation of the interrogation interface 108 that satisfies the response-selective criteria.

Figure 3:
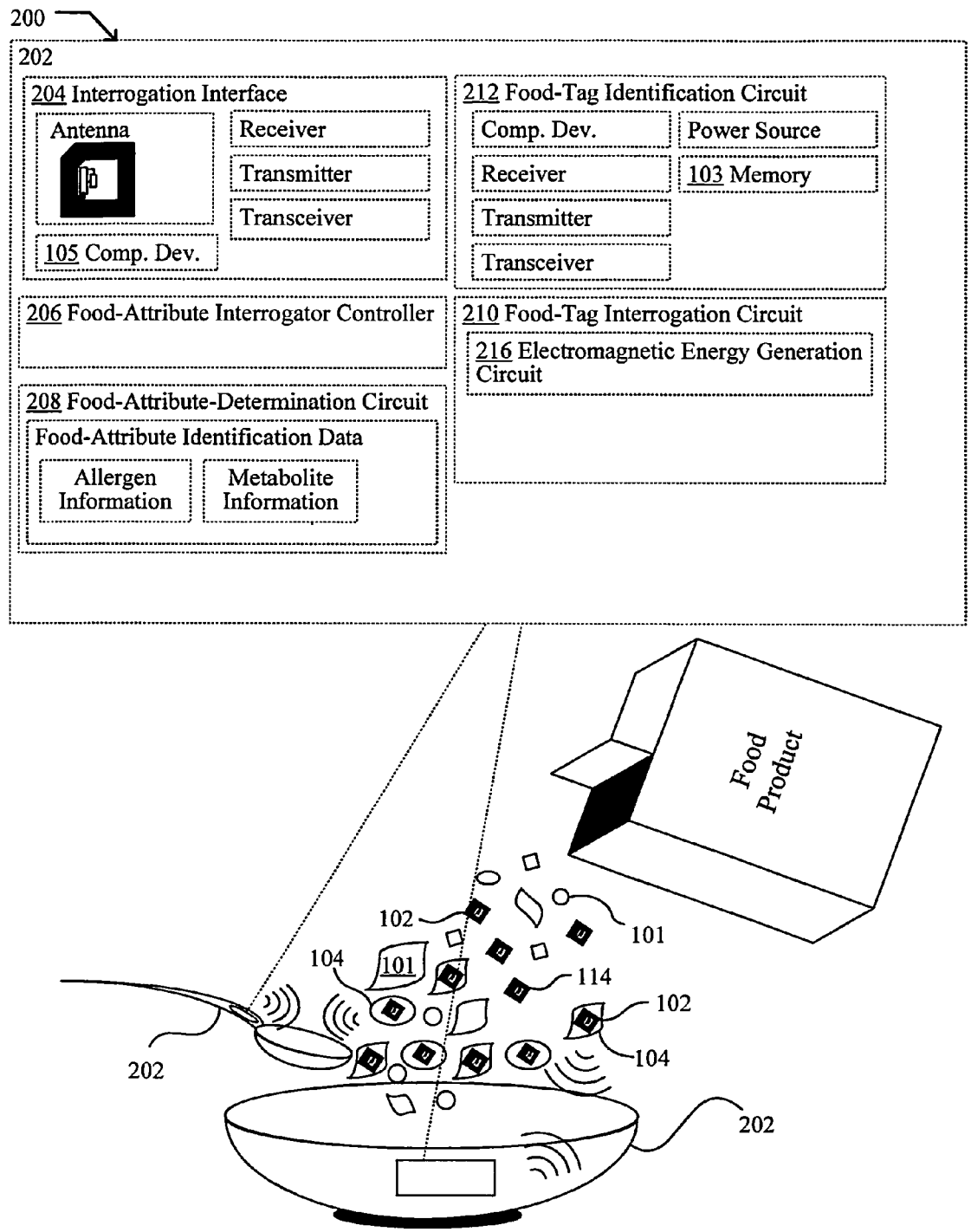
FIG. 3 is a perspective view of a system according to one embodiment.
Figure 4:
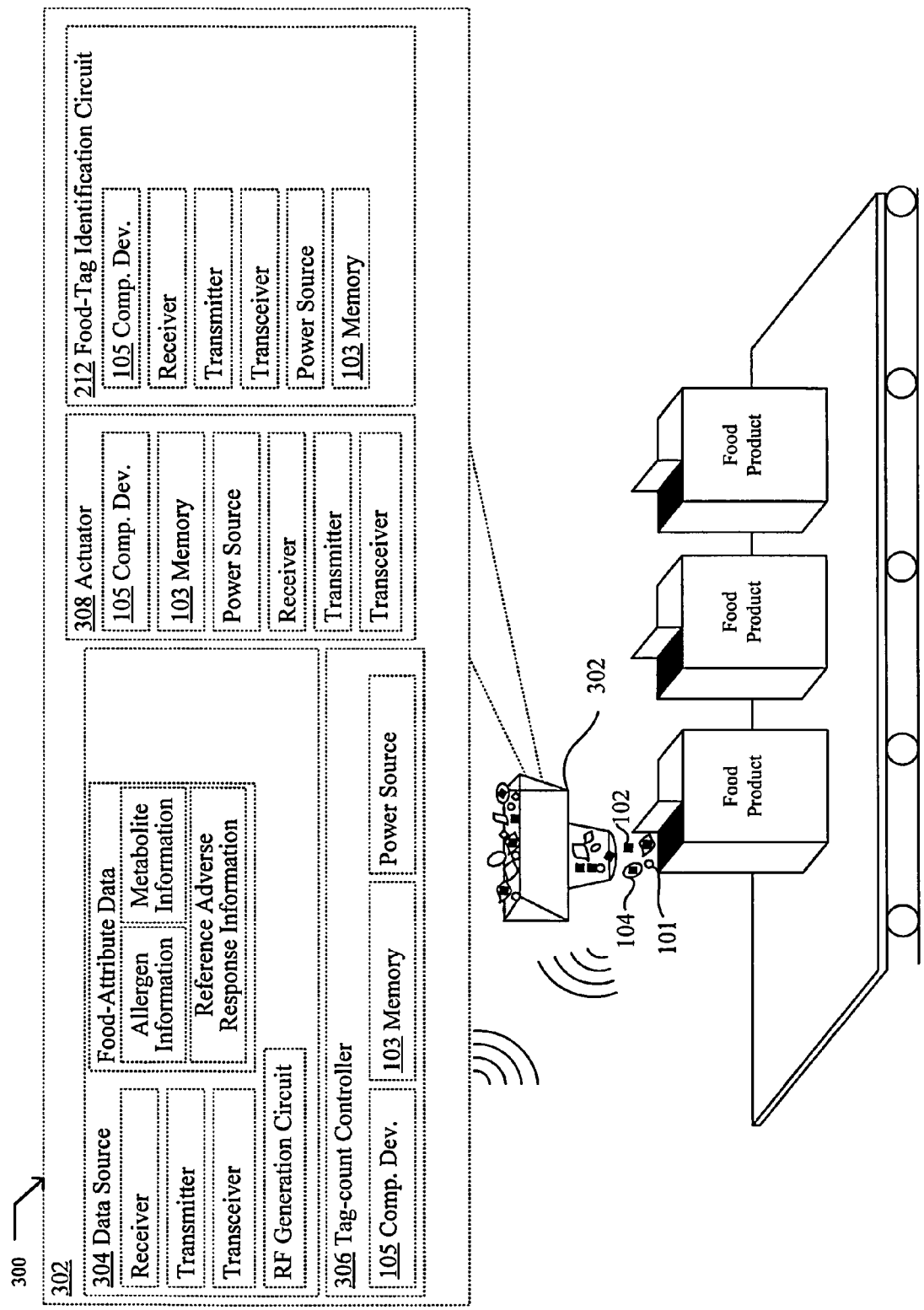
FIG. 4 is a perspective view of a system according to one embodiment.

Referring to FIGS. 1, 2, and 3, in an embodiment, a food utensil 202 (e.g., a food container, food preparation utensils, food storage apparatuses, kitchenware, cookware, food preparation apparatuses, food processors, cooking implements, cooking utensils, etc.) includes at least one interrogation interface 204 (e.g., an antenna, etc.) configured to interrogate radio frequency identification tags 114 in a volume of food product. In an embodiment, a food utensil 202 includes a body structure that is substantially transparent to electromagnetic energy in the radio frequency range.

In an embodiment, a food utensil 202 includes a food attribute interrogator controller 206 operatively coupled to the at least one interrogation interface 204 and is configured to indicate the presence of one or more instances of data indicative of at least one food attribute. In an embodiment, the at least one interrogation interface 204 is operable to deliver a time-division multiplex stimulus. In an embodiment, the at least one interrogation interface 204 is operable to deliver a space-division multiplex stimulus. In an embodiment, the at least one interrogation interface 204 is operable to deliver a code-division multiple access stimulus. In an embodiment, the at least one interrogation interface 204 is operable to deliver an electromagnetic energy stimulus associated with a food-attribute-specific frequency. In an embodiment, the at least one interrogation interface 204 is operable to deliver an electromagnetic energy stimulus associated with a food-attribute-specific carrier waveform. In an embodiment, the at least one interrogation interface 204 is operable to deliver an electromagnetic energy stimulus associated with at least one of an allergen-specific frequency or an allergen-specific carrier waveform.

In an embodiment, the food attribute interrogator controller 206 is operable to actuate at least one of a visual representation, an audio representation, a haptic representation, or a tactile representation indicative of the presence of one or more instances of data indicative of at least one food attribute. In an embodiment, the food attribute interrogator controller 206 is operable to a indicate the presence of one or more instances of data indicative of at least one food attribute, via an electromagnetic energy signal, to a remote display. In an embodiment, the food attribute interrogator controller 206 is operable to actuate a remote display, via an electromagnetic energy signal.

In an embodiment, the at least one interrogation interface 204 is operable to deliver an electromagnetic energy stimulus of a character and for a duration sufficient to elicit food-attribute-specific data upon interrogation of one or more radio frequency identification tags 114 in the volume of food product. In an embodiment, the at least one interrogation interface 204 is operable to deliver an electromagnetic energy stimulus of a character and for a duration sufficient to elicit allergen-specific data upon interrogation of the radio frequency identification tags 114 in the volume of food product.

In an embodiment, the food-attribute interrogator controller 206 forms part of a food preparation utensil. In an embodiment, the food-attribute interrogator controller 206 forms part of a food storage utensil. In an embodiment, a food utensil 202 includes a body structure configured as a food consumption implement and at least one antenna embedded in, formed on, or intrinsic with the body structure. In an embodiment, the at least one antenna is operatively coupled to at least one radio frequency identification tag within a volume of food product proximate the food consumption implement. In an embodiment, the food utensil 202 includes a food-attribute-determination circuit 208 including a memory circuit having reference food-attribute determination data stored thereon. In an embodiment, the food-attribute-determination circuit 208 is operably coupled to the at least one antenna via one or more interconnects.

In an embodiment, a system 200 includes a food-tag-interrogation circuit 210 configured to irradiate a volume of food product carrying a plurality of radio frequency identification tags 114 with a radio interrogation beam and to elicit a forward scattered modulated response from at least a portion of the plurality of radio frequency identification tags 114. In an embodiment, the system 200 includes a food-tag identification circuit 212 configured to measure a forward-scattered modulated response of the plurality of radio frequency identification tags 114. In an embodiment, the food-tag identification circuit 212 includes a computing device and is configured to decode data from the radio frequency identification tags 114 and to determine one or more food conditions corresponding to the decoded data.

In an embodiment, the system 200 includes an electromagnetic energy generation circuit 216 (e.g., radio frequency generation circuit, electromagnetic energy generation circuit, etc.). In an embodiment, the electromagnetic energy generation circuit 216 elicits food-attribute data in response to electromagnetic energy interrogation of at least one transponder (e.g., radio frequency identification tag, edible transponder device, etc.) carried within a volume of a food product. In an embodiment, the electromagnetic energy generation circuit 216 includes a food-attribute-identification circuit 106. In an embodiment, food-attribute-identification circuit 106 compares elicited food-attribute data to food-attribute filtering data, and activates at least one of an allergen alerting protocol, a food-attribute-identification protocol, or a code generation protocol based on the comparison. In an embodiment, the food-attribute filtering data includes data associated with an adverse response to food. In an embodiment, the food-attribute-identification circuit 106 includes a computing device configured to generate an output associated with an indication regarding one or more attributes of the volume of food product based on the comparison.

In an embodiment, the food-attribute filtering data includes reference allergen data, reference food-attribute data, user-specific allergen alert data, or user-specific allergen response data. In an embodiment, the food-attribute filtering data includes reference food metabolite content data, reference food metabolite response data, or reference food metabolite alerting data. In an embodiment, the electromagnetic energy generation circuit 216 includes at least one of an amplitude modulation communication module, a code-division multiple access communication module, a direct-sequence ultra-wideband communication module, a frequency division multiple access communication module, a frequency modulation communication module, a multi-band orthogonal frequency-division multiplexing-based ultra-wideband communication module, an orthogonal frequency division multiple access communication module, a time division multiple access communication module, an ultra-wideband communication module, or the like.

In an embodiment, an apparatus for disabling radio frequency identification tags 114 includes a radio frequency interrogator configured to probe for radio frequency identification tags 114 and a cleaning solution dispenser operatively coupled to the radio frequency interrogator and configured to dispense a cleaning solution disables at least a portion of radio frequency identification tags 114 found by the radio frequency interrogator. In an embodiment, an apparatus for disabling radio frequency identification tags 114 includes a cleaning apparatus including at least one of an electromagnetic field generator or a sonic generator. In an embodiment, the electromagnetic field generator or the sonic generator is operable to deliver an electromagnetic field stimulus or a sonic stimulus, respectively, of a character and for a duration sufficient to disable a substantial portion of a plurality of radio frequency identification tags 114 forming part of a food composition.

In an embodiment, an admixture of transponder devices and a food product includes a quantity of food product (e.g., food, food precursor, pet food products, snacks pieces, finished food products, livestock feed, or the like), and a plurality of edible transponder devices 102. In an embodiment, an admixture includes a quantity of food product and a plurality of radio frequency identification tags 114. In an embodiment, each of the plurality of radio frequency identification tags 114 includes an interrogation interface 108, and a food-attribute-identification circuit 106 operably coupled to the interrogation interface 108.

In an embodiment, the food-attribute-identification circuit 106 is disposed on the edible substrate and includes one or more memory circuits 103 having food-attribute data associated with the food product stored thereon. In an embodiment, the quantity of food product includes a quantity of food or a quantity of food precursor. In an embodiment, the quantity of food product includes one or more Generally Recognized As Safe (GRAS) substances.

In an embodiment, the plurality of radio frequency identification tags 114 are configured to provide food-attribute data in response to electromagnetic energy interrogation. In an embodiment, the food-attribute data include data corresponding to at least one of data associated with an adverse response to food, an allergen content, an allergen response protocol, or an allergen alerting protocol. In an embodiment, the food-attribute data include allergen-specific multi-bit codes. In an embodiment, the food-attribute data include an envelope message encrypted with a food-attribute-specific key. In an embodiment, the food-attribute data include at least one of a data envelope encoding an industry-recognized data identifier or an application identifier corresponding to the food-attribute data. In an embodiment, the food-attribute data include a plurality of data identifiers or application identifiers corresponding to a food attribute associated with the food product.

In an embodiment, a food product includes a quantity of food product and a quantity of radio frequency identification tags 114 in a stochastic distribution within the quantity of food product. In an embodiment, each radio frequency identification tag includes a food-attribute-identification circuit 106 having food-attribute data stored on one or more memory circuits 103. In an embodiment, the quantity of radio frequency identification tags 114 includes a number of radio frequency identification tags 114 sufficient to provide a probability of detection in the quantity of food product. In an embodiment, the quantity of radio frequency identification tags 114 and the quantity of food product are of a quantity sufficient to provide a probability of detection sufficient to cause a reading system to read data from instances of the radio frequency identification tags 114 having a cumulative value about equal to an attribute (e.g., intrinsic attribute, extrinsic attribute) of the quantity of food product. In an embodiment, the radio frequency identification tags 114 include a property or structure that maintains the stochastic distribution within the quantity of food product during one or more of food conveyance, handling, storage, cooking, or consumption (e.g., eating, digesting, elimination, disposal, etc.). In an embodiment, the quantity of radio frequency identification tags includes a number that is proportional to a food attribute content.

In an embodiment, an admixture of transponder devices and a food product includes a quantity of food product and a plurality of plurality of palatable transponders 52. In an embodiment, each of the plurality of palatable transponders 52 includes a substrate 104 carrying an integrated circuit manufactured to reduce interactions with a human digestive tract. In an embodiment, each of the plurality of palatable transponders 52 includes an encapsulant 54 including a material having an attribute that reduces an ability of a person to discriminate between a palatable transponder and a food product.

In an embodiment, an attribute-identifying food product includes a quantity of food product and a plurality of radio frequency identification tags 114. In an embodiment, each of the plurality of radio frequency identification tags 114 includes a food-attribute-identification circuit having one or more physical data structures having food-attribute data indicative of at least one food attribute stored thereon, and an interrogation-selective interface operably coupled to the food-attribute-identification circuit 106. In an embodiment, the interrogation-selective interface is responsive to interrogation by an electromagnetic energy stimulus associated with a food-attribute-specific frequency. For example, in an embodiment, the interrogation-selective interface is responsive to interrogation by an electromagnetic energy stimulus associated with a food-attribute-specific carrier waveform. In an embodiment, the interrogation-selective interface is responsive to at least one of an allergen-specific frequency, or an allergen-specific carrier waveform. In an embodiment, the interrogation-selective interface generates a response signal corresponding to allergen-specific data responsive to interrogation of the interrogation-selective interface that satisfies response-selective criteria.

In an embodiment, the interrogation interface 108 includes one or more conductive traces disposed on an edible substrate 104. In an embodiment, the one or more physical data structures include food-attribute data indicative of an allergen content. In an embodiment, the one or more physical data structures include food-attribute data indicative of an allergen response protocol. In an embodiment, the one or more physical data structures include food-attribute data indicative of an allergen alerting protocol. In an embodiment, the food-attribute-identification circuit 106 alternates between a food-attribute data transmit state and a non-transmit state in response to electromagnetic interrogation of the interrogation-selective interface that satisfies interrogation-selective criteria. In an embodiment, the food-attribute-identification circuit 106 includes an integrated circuit that modulates and demodulates a radio-frequency interrogation stimulus according to an allergen-selective criterion.

In an embodiment, a food product includes a plurality of food particles and at least one food-attribute-identification circuit 106 including an interrogation interface 108. In an embodiment, the food-attribute-identification circuit 106 includes food-attribute data stored on one or more memory circuits 103. In an embodiment, the food-attribute-identification circuit 106 is coupled to one or more of the plurality of food particles.

In an embodiment, an admixture of radio frequency identification tags 114 and a food product includes a quantity of food product and a plurality of micro-transponder sets. In an embodiment, at least one of the plurality of micro-transponder sets includes an interrogation-selective criteria different from another of the plurality of micro-transponder sets. For example, in an embodiment, each micro-transponder set includes at least one micro-transponder having a food-attribute-identification circuit 106 including at least one physical data structure having food-attribute data stored thereon, and an interrogation-selective interface operably coupled to the food-attribute-identification circuit 106. In an embodiment, the interrogation-selective interface is operable to provide food-attribute data in response to electromagnetic interrogation of the interrogation-selective interface that satisfies interrogation-selective criteria.

In an embodiment, a system 300 includes an apparatus 302 for embedding radio frequency identification tags 114 in a food product. In an embodiment, an apparatus 302 for embedding radio frequency identification tags 114 in a food product includes a data source 304 configured to provide data corresponding to a food attribute of a food product and a tag-count controller 306 configured to determine at least an approximate number of radio frequency identification tags 114 for insertion into the food product based on a measured food product attribute. In an embodiment, the food attribute includes a quantity (e.g., weight, volume, etc.) associated with the food product. In an embodiment, the food attribute includes an intrinsic or extrinsic attribute associated with the food product. In an embodiment, an apparatus 302 for embedding radio frequency identification tags 114 in a food product includes an actuator 308 operatively coupled to the tag-count controller 306 and configured to cause the insertion of the at least approximate number of radio frequency identification tags 114 into the food product.

In an embodiment, the approximate number of tags is a number sufficient to provide a probability of detection of at least one tag in a unit weight or volume of the food product. In an embodiment, the approximate number of tags is a number sufficient to provide a probability of detection through one or more food product dispensing actions. In an embodiment, the number of tags is a number sufficient to provide a probability of detection through two or more food product dispensing actions. In an embodiment, the approximate number of tags is a number sufficient to provide a probability of unique tag detection corresponding to the extrinsic food attribute. In an embodiment, the insertion of the at least approximate number of radio frequency identification tags 114 into the food product is determined based on a radio frequency identification tag antenna sensitivity or radiation pattern associated with the radio frequency identification tags 114 for insertion.

In an embodiment, the data source 304 includes a sensor component that measures one or more food attributes associated with the food product. In an embodiment, the data source 304 includes a flow meter or a spectrometer. In an embodiment, the data source 304 includes one or more sensors that detect at least one allergen profile of the food product. In an embodiment, the data source 304 includes a sensor component having one or more sensors that measure an intrinsic food attribute of the food product. In an embodiment, the data source 304 includes a food product handling controller.

In an embodiment, the actuator 308 is a portion of a food product harvesting apparatus, a food product refining apparatus, a food product transport apparatus, a food product forming apparatus, a food product cooking apparatus, or a food product packaging apparatus. In an embodiment, the actuator 308 is configured to dispense the radio frequency identification tags 114 into a continuous flow or pseudo-continuous flow of the food product.

In an embodiment, an apparatus 302 for embedding radio frequency identification tags 114 in a food product includes a sensor component and a tag-count controller 306. In an embodiment, the sensor component includes one or more sensors that measure a food attribute of a food product. In an embodiment, the tag-count controller 306 is configured to determine at least an approximate number of radio frequency identification tags 114 for insertion into the food product based on a measured food attribute.

In an embodiment, the apparatus for embedding radio frequency identification tags 114 in a food product includes an actuator 308 operatively coupled to the tag-count controller 306 and configured to cause the insertion of the at least approximate number of radio frequency identification tags 114 into the food product. In an embodiment, a system for mixing radio frequency identification tags 114 includes a dispenser controller configured to actuate insertion of radio frequency identification tags 114 into a food product, and a food-tag interrogator. In an embodiment, the food-tag interrogator is configured to output commands to the radio frequency identification tags 114 to change a response frequency of one or more antennas, while the radio frequency identification tags 114 are suspended in the food product.

FIG. 5 shows a method 500. At 510, the method 500 includes writing onto a memory circuit of a radio frequency identification tag structured data indicative of at least one food attribute. At 512, writing onto the memory circuit of the radio frequency identification tag includes writing structured data corresponding to at least one food attribute including at least one of an allergen content, an allergen response protocol, or an allergen alerting protocol. At 514, writing onto the memory circuit of the radio frequency identification tag includes inserting at least one data element associated with a food attribute into a data field corresponding to a food-attribute-specific data identifier or food-attribute-specific application identifier. At 516, writing onto the memory circuit of the radio frequency identification tag includes writing at least one data identifier or application identifier associated with the at least one food attribute.

At 520, the method 500 includes implementing at least one of an authorization protocol, an authentication protocol, or an activation protocol responsive to electromagnetic interrogation of the radio frequency identification tag prior to writing onto the memory circuit of the radio frequency identification tag. In an embodiment, implementing at least one of the authorization protocol, the authentication protocol, or the activation protocol responsive to electromagnetic interrogation of the radio frequency identification tag prior to writing onto the memory circuit of the radio frequency identification tag include includes implementing at least one authorization protocol associated with an enterprise.

At 530, the method 500 includes writing onto the memory circuit of the radio frequency identification tag structured data indicative of at least one of a nutritional value, a nutritional value per volume, a nutritional value per weight, a nutritional value per serving, a percentage of recommended daily allowance per volume, a percentage of recommended daily allowance per weight, or a percentage of recommended daily allowance per serving. At 540, the method 500 includes writing onto the memory circuit of the radio frequency identification tag structured data indicative of at least one of a protein content, a carbohydrate content, a vitamin content, a mineral content, a calorie content, or an ingredient. At 550, the method 500 includes writing onto the memory circuit of the radio frequency identification tag structured data indicative of at least one of a religious dietary requirement, an enterprise association, an enterprise authorization, a calorie control plan, or a diet point plan.

FIG. 6 shows a method 600 for making a radio frequency identification tag carried by food particles. At 610, the method 600 includes physically coupling an integrated circuit including food-attribute-identification circuit 106 having food-attribute data stored thereon and an interrogation interface 108 onto an edible substrate 104. At 612, physically coupling the integrated circuit onto the edible substrate includes attaching the integrated circuit onto the edible substrate with an edible adhesive. At 614, physically coupling the integrated onto the edible substrate includes physically coupling the integrated circuit onto a package that provides at least one of shape or density to keep the integrated circuit suspended in the food. At 620, the method 600 includes at least partially embedding the integrated circuit in an elastomeric package configured to reduce human sensory feedback when the integrated circuit is in a human dental occlusion. In an embodiment a method for making an edible transponder includes at least partially embedding an integrated circuit, including an interrogation interface 108, in an elastomeric package configured to reduce human sensory feedback when the integrated circuit is in a human dental occlusion.

FIG. 7 shows a method 700. At 710, the method 700 includes combining a first quantity of radio frequency identification tags 114 with a second quantity of food product in a stochastic distribution. At 712, combining the first quantity of radio frequency identification tags 114 with the second quantity of food product includes combining a sufficient number of tags with the second quantity of food product to provide a probability of detection of at least one tag in a unit weight or volume of the food product. At 714, combining the first quantity of radio frequency identification tags 114 with the second quantity of food product includes combining a sufficient number of tags with the second quantity of food product to provide a probability of detection of at least one tag in the second quantity of the food product. At 720, the method 700 includes mixing the first quantity of radio frequency identification tags 114 with the second quantity of food product.

Figure 8:
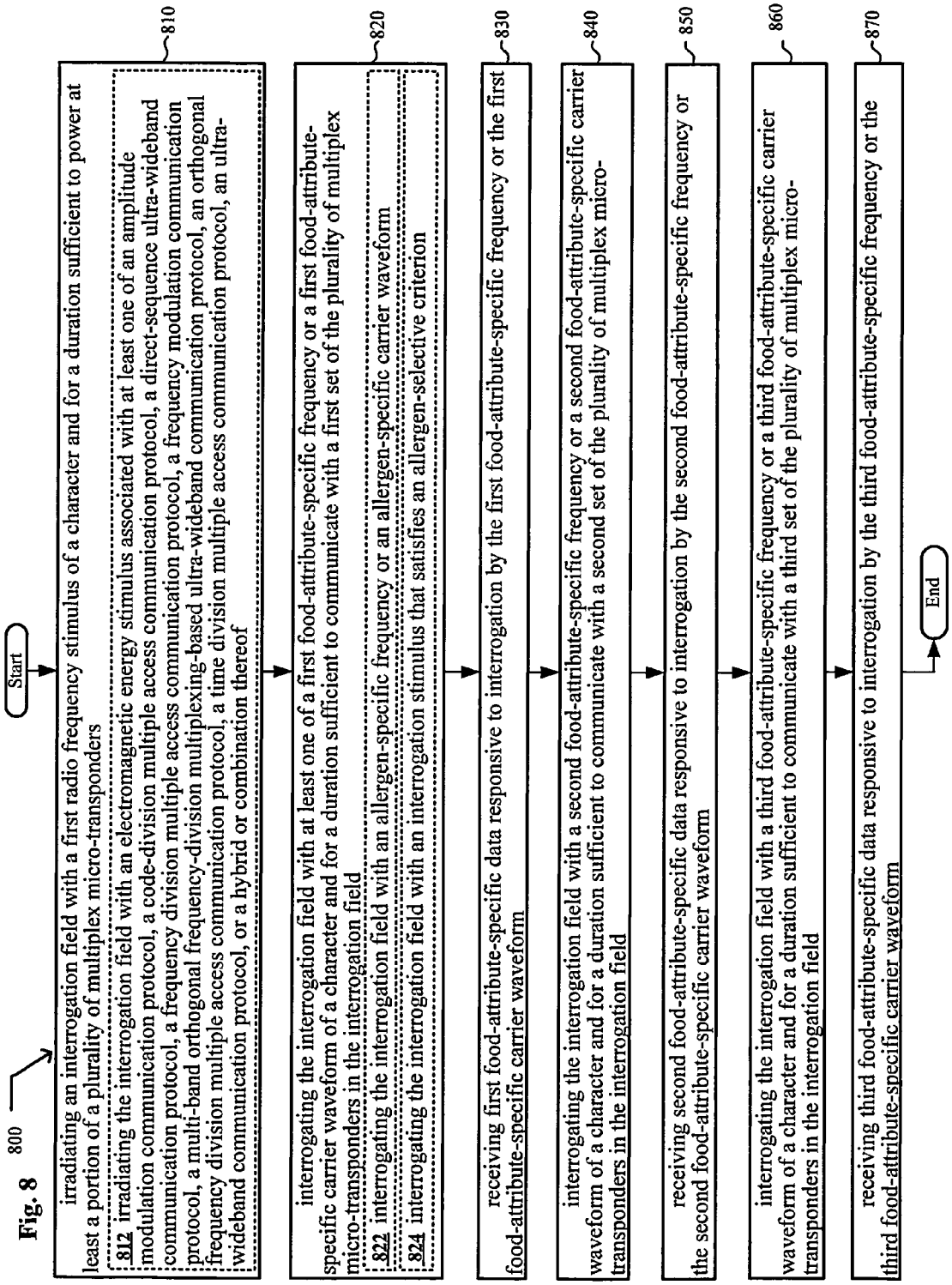
FIG. 8 shows a flow diagram of a method for interrogating a plurality of multiplex micro-transponders according to one embodiment.

FIG. 8 shows a method 800 for interrogating a plurality of multiplex micro-transponders. At 810, the method 800 includes irradiating an interrogation field with a first radio frequency stimulus of a character and for a duration sufficient to power at least a portion of a plurality of multiplex micro-transponders. At 812, irradiating the interrogation field with the first radio frequency stimulus includes irradiating the interrogation field with an electromagnetic energy stimulus associated with at least one of an amplitude modulation communication protocol, a code-division multiple access communication protocol, a direct-sequence ultra-wideband communication protocol, a frequency division multiple access communication protocol, a frequency modulation communication protocol, a multi-band orthogonal frequency-division multiplexing-based ultra-wideband communication protocol, an orthogonal frequency division multiple access communication protocol, a time division multiple access communication protocol, an ultra-wideband communication protocol, or a hybrid or combination thereof.

At 820, the method 800 includes interrogating the interrogation field with at least one of a first food-attribute-specific frequency or a first food-attribute-specific carrier waveform of a character and for a duration sufficient to communicate with a first set of the plurality of multiplex micro-transponders in the interrogation field. At 822, interrogating the interrogation field with at least one of the first food-attribute-specific frequency or the first food-attribute-specific carrier waveform includes interrogating the interrogation field with an allergen-specific frequency or an allergen-specific carrier waveform. At 824, interrogating the interrogation field with at least one of the first food-attribute-specific frequency or the first food-attribute-specific carrier waveform includes interrogating the interrogation field with an interrogation stimulus that satisfies an allergen-selective criterion.

At 830, the method 800 includes receiving first food-attribute-specific data responsive to interrogation by the first food-attribute-specific frequency or the first food-attribute-specific carrier waveform. At 840, the method 800 includes interrogating the interrogation field with a second food-attribute-specific frequency or a second food-attribute-specific carrier waveform of a character and for a duration sufficient to communicate with a second set of the plurality of multiplex micro-transponders in the interrogation field. At 850, the method 800 includes receiving second food-attribute-specific data responsive to interrogation by the second food-attribute-specific frequency or the second food-attribute-specific carrier waveform. At 860, the method 800 includes interrogating the interrogation field with a third food-attribute-specific frequency or a third food-attribute-specific carrier waveform of a character and for a duration sufficient to communicate with a third set of the plurality of multiplex micro-transponders in the interrogation field. At 870, the method 800 includes receiving third food-attribute-specific data responsive to interrogation by the third food-attribute-specific frequency or the third food-attribute-specific carrier waveform.

FIG. 9 shows a method 900 for monitoring food intake. At 910, the method 900 includes receiving data from an admixture of radio frequency identification tags 114 and a food product interrogated by a radio frequency interrogator, the data corresponding to one or more food attributes associated with the food product. At 912, receiving data from the admixture of radio frequency identification tags 114 and the food product interrogated by a radio frequency interrogator includes acquiring two or more bit streams associated with data corresponding to one or more food attributes. At 914, receiving data from the admixture of radio frequency identification tags 114 and the food product interrogated by a radio frequency interrogator includes receiving structured data corresponding to at least one food attribute including at least one of an allergen content, an allergen response protocol, or an allergen alerting protocol.

At 920, the method 900 includes outputting an indication associated with one or more attributes of the food product based on a comparison between received data from the radio frequency identification tags 114 and filtering information. At 922, outputting the indication includes generating at least one of a visual representation, an audio representation, a haptic representation, or a tactile representation indicative of one or more attributes or cumulative attributes of the food product. At 924, outputting the indication includes generating at least one of a visual representation, an audio representation, a haptic representation, or a tactile representation indicative of at least one of an allergen content, an allergen response protocol, or an allergen alerting protocol. In an embodiment, outputting the indication includes generating at least one of a visual representation, an audio representation, a haptic representation, or a tactile representation indicative of at least one of a metabolite content, a metabolite response protocol, or a metabolite alerting protocol.

FIG. 10 shows a method 1000 for interrogating radio frequency identification tags 114. At 1010, the method 1000 includes irradiating an admixture of radio frequency identification tags 114 and a food product with a first radio frequency of a character and for a duration sufficient to power a radio frequency identification tag. At 1012, irradiating the admixture of radio frequency identification tags 114 and a food product includes generating a wide field radio frequency interrogation stimulus to determine one or more radio frequency identification tag locations within the wide field. At 1020, the method 1000 includes interrogating the admixture of radio frequency identification tags 114 and a food product with a second radio frequency of a character and for a duration sufficient to communicate with one or more radio frequency identification tags 114 in the interrogation field. At 1022, interrogating the admixture of radio frequency identification tags 114 and a food product with the second radio frequency includes determining one or more beam-forming parameters of a radio frequency beam for a radio frequency interrogation stimulus, and interrogating one or more locations within a wide field with the radio frequency beam.

FIG. 11 shows a method 1100 for monitoring food. At 1110, the method 1100 includes decoding data elicited by radio frequency interrogation of radio frequency identification tags 114 within a volume of food product proximate a food consumption implement. At 1112, decoding the data elicited by radio frequency interrogation includes decoding a data value from the at least one radio frequency identification tag to determine at least one of a food handling conditions, a food preparation condition, or food consumption condition. At 1120, the method 1100 includes generating a response based on the data decoding, the generated response indicative of the one or more food attributes associated with the volume of food product proximate the food consumption implement.

FIG. 12 shows a method 1200 for determining a food condition. At 1210, the method 1200 includes interrogating at least one radio frequency identification tag carried by food. At 1220, the method 1200 includes decoding a data value from the at least one radio frequency identification tag to determine a food condition.

FIG. 13 shows a method 1300 for making a radio frequency identification tag to track food. At 1310, the method 1300 includes forming at least one electrical trace on a substrate configured to change state during a food handling, preparation, or consumption condition. At 1320, the method 1300 includes operatively coupling the at least one electrical trace to an interrogation interface 108 of an integrated circuit.

FIG. 14 shows a method 1400 of manufacturing an edible transponder device.

At 1410, the method 1400 includes writing food-attribute information onto a memory circuit of an edible transponder device having an interrogation interface 108 operatively coupled to the memory circuit. At 1412, writing food-attribute information onto a memory circuit of an edible transponder device includes writing data indicative of one or more of an allergen content, an allergen response protocol, or an allergen alerting protocol onto the memory circuit of the edible transponder device 102.

At 1420, the method 1400 includes initiating at least one of an authorization protocol, an authentication protocol, or an activation protocol responsive to electromagnetic interrogation of an interrogation-selective interface prior to writing onto the memory circuit of the radio frequency identification tag. In an embodiment, initiating at least one of the authorization protocol, the authentication protocol, or the activation protocol includes initiating at least one of an enterprise-specific authorization protocol, an enterprise-specific authentication protocol, or an enterprise-specific activation protocol responsive to electromagnetic interrogation of an interrogation-selective interface prior to writing onto the memory circuit of the radio frequency identification tag At 1430, the method 1400 includes writing a key according to at least one of an activation protocol or a deactivation protocol onto the memory circuit of the edible transponder device. At 14140, the method 1400 includes writing a user specific security code onto a memory circuit of the edible transponder. At 1450, the method 1400 includes writing onto a memory circuit of the edible transponder a key according to an allergen-specific encryption protocol or an allergen-specific decryption protocol. At 1460, the method 1400 includes writing onto a memory circuit of the edible transponder a key according to at least one of a cryptographic protocol, encryption protocol, or decryption protocol. At 1470, the method 1400 includes writing onto a memory circuit of the edible transponder a key according to at least one of a regulatory use protocol or a regulatory compliance protocol.

At 1480, the method 1400 includes writing onto a memory circuit of the edible transponder a key according to at least one of an authentication protocol, an authorization protocol, an activation protocol, or a deactivation protocol. At 1490, the method 1400 includes writing onto a memory circuit of the edible transponder data associated with at least one of an amplitude modulation communication protocol, a code-division multiple access communication protocol, a direct-sequence ultra-wideband communication protocol, a frequency division multiple access communication protocol, a frequency modulation communication protocol, an orthogonal frequency division multiple access communication protocol, a time division multiple access communication protocol, an ultra-wideband communication protocol, or a hybrid or combination protocol thereof.

FIG. 15 shows a method 1500 for making a palatable transponder 52. At 1510, the method 1500 includes at least partially embedding an integrated circuit, including a food-attribute-identification circuit operably coupled to an interrogation interface, in an encapsulant 54 having one or more organoleptic attributes that mimic the food product.

FIG. 16 shows a method 1600 for making a palatable transponder 52. At 1610, the method 1600 includes at least partially embedding an integrated circuit, including a food-attribute-identification circuit operably coupled to an interrogation interface, in an encapsulant 54 having one or more organoleptic attributes that mimic the food product. In an embodiment, the method 1600 includes at least partially embedding an integrated circuit, including an interrogation interface, in an elastomeric package configured to reduce human sensory feedback when the integrated circuit is in a human dental occlusion.

At least a portion of the devices and/or processes described herein can be integrated into a data processing system. A data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for detecting position and/or velocity, control motors for moving and/or adjusting components and/or quantities). A data processing system can be implemented utilizing suitable commercially available components, such as those typically found in data computing/communication and/or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably coupleable," to each other to achieve the desired functionality. Specific examples of operably coupleable include, but are not limited to, physically mateable and/or physically interacting components, and/or wirelessly interactable, and/or wirelessly interacting components, and/or logically interacting, and/or logically interactable components.

In an embodiment, one or more components may be referred to herein as "configured to," "configurable to," "operable/operative to," "adapted/adaptable," "able to," "conformable/conformed to," etc. Such terms (e.g., "configured to") can generally encompass active-state components and/or inactive-state components and/or standby-state components, unless context requires otherwise.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by the reader that each function and/or operation within such block diagrams, flowcharts, or examples can be implemented, individually and/or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings includes overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An edible transponder device, comprising:
  an edible circuit substrate having a food-attribute-identification circuit disposed thereon, the edible circuit substrate having one or more organoleptic attributes that mimic a food product;
  the food-attribute-identification circuit including one or more memory circuits having food-attribute data stored thereon, the food-attribute data including physiological response data associated with the food product; and
  a first interrogation interface operably coupled to the food-attribute-identification circuit, the food-attribute-identification circuit configured to provide food-attribute data in response to interrogation of the first interrogation interface.

2. The edible transponder device of claim 1, wherein the food-attribute data includes one or more of advertising data, brand data, country of origin data, distributer data, manufacturer data, packaging data, or warranty data.

3. The edible transponder device of claim 1, wherein the food-attribute data includes one or more of coupon data, rebate data, or sweepstake data.

4. The edible transponder device of claim 1, wherein the food-attribute data includes enterprise specific data.

5. The edible transponder device of claim 1, wherein the physiological response data associated with the food product includes at least one of an allergen content, an allergen response protocol, or an allergen alerting protocol stored thereon.

6. The edible transponder device of claim 1, wherein the food-attribute-identification circuit includes one or more memory circuits having food-attribute data indicative of at least one of a metabolite content, a metabolite response protocol, or a metabolite alerting protocol stored thereon.

7. The edible transponder device of claim 1, wherein the food-attribute-identification circuit includes a logic control circuit that generates a response indicative of at least one of an allergen content, an allergen response protocol, or an allergen alerting protocol in response to interrogation of the first interrogation interface.

8. The edible transponder device of claim 1, wherein the food-attribute-identification circuit includes a logic control circuit that generates at least one of a digital or analogue response associated with the food-attribute data in response to interrogation of the first interrogation interface.

9. The edible transponder device of claim 1, wherein the food-attribute-identification circuit includes one or more memory circuits having structured data indicative of at least one of an allergen content, an allergen response protocol, or an allergen alerting protocol.

10. The edible transponder device of claim 1, wherein the food-attribute-identification circuit and the first interrogation interface form part of an integrated circuit die.

11. The edible transponder device of claim 1, wherein the food-attribute-identification circuit and the first interrogation interface form part of an integrated circuit die having a major dimension of less than about 0.4 millimeters.

12. The edible transponder device of claim 1, wherein the interrogation interface includes an antenna that is responsive based on an allergen-specific criterion.

13. The edible transponder device of claim 1, wherein the interrogation interface is responsive to an allergen-specific carrier waveform.

14. The edible transponder device of claim 1, wherein the interrogation interface is responsive to an allergen-specific frequency.

15. The edible transponder device of claim 1, wherein the interrogation interface is responsive based on a message authentication protocol.

16. The edible transponder device of claim 1, wherein the edible transponder device takes the form of an active, carrier-wave-selective, radio frequency identification tag.

17. The edible transponder device of claim 1, wherein the edible transponder device takes the form of a semi-passive, carrier-wave-selective, radio frequency identification tag.

18. The edible transponder device of claim 1, wherein the edible transponder device takes the form of a passive, carrier-wave-selective, radio frequency identification tag.

19. The edible transponder device of claim 1, wherein the edible circuit substrate includes material that mimics a food product.

20. The edible transponder device of claim 1, wherein the edible circuit substrate includes material that mimics at least one of appearance, aroma, color, softness, taste, or texture of a food product.

21. A radio frequency identification tag, comprising:
an edible circuit substrate fabricated from at least one edible material, the edible circuit substrate having one or more materials that mimic at least one of appearance, aroma, color, softness, taste, or texture of a food product;
a food-attribute-identification circuit disposed on the edible circuit substrate, the food-attribute-identification circuit including programmable storage having food-attribute data stored thereon, the food-attribute data stored thereon including physiological response data associated with the food product; and
at least one interrogation interface operably coupled to the food-attribute-identification circuit and disposed on the edible circuit substrate, the at least one interrogation interface responsive to electromagnetic energy interrogation,
the food-attribute-identification circuit operable to generate at least one of a digital or analogue response associated with the physiological response data responsive to interrogation of the at least one interrogation interface.

22. The radio frequency identification tag of claim 21, wherein the edible circuit substrate includes a food product.

23. The radio frequency identification tag of claim 21, wherein the edible circuit substrate includes one or more Generally Recognized As Safe (GRAS) substances.

24. The radio frequency identification tag of claim 21, wherein the edible circuit substrate includes one or more water-soluble edible polymeric materials.

25. The radio frequency identification tag of claim 21, wherein the edible circuit substrate includes poly(L-lactid-co-glycolide).

26. The radio frequency identification tag of claim 21, wherein the edible circuit substrate includes an edible adhesive polymer.

27. The radio frequency identification tag of claim 21, wherein the food-attribute-identification circuit is printed on the edible circuit substrate.

28. The radio frequency identification tag of claim 21, wherein the food-attribute-identification circuit is printed on the edible circuit substrate using edible conductive ink.

29. The radio frequency identification tag of claim 21, wherein the food-attribute-identification circuit is attached to the edible circuit substrate using an edible adhesive.

30. The radio frequency identification tag of claim 21, wherein the food-attribute-identification circuit toggles between a transmit state and a receive state upon electromagnetic energy interrogation.

31. The radio frequency identification tag of claim 21, wherein at least a portion of the radio frequency identification tag includes an edible covering.

32. The radio frequency identification tag of claim 21, wherein at least a portion of the radio frequency identification tag is encapsulated within a food product.

33. The radio frequency identification tag of claim 21, wherein the radio frequency identification tag toggles between a transmit state and a receive state upon receipt of an authorization key.

34. The radio frequency identification tag of claim 21, wherein the radio frequency identification tag toggles between a transmit state and a receive state upon receipt of an enterprise authorization key.

35. The radio frequency identification tag of claim 21, wherein the edible material comprises at least one of starch material, maize, degradable soybean material, soy protein, cereal protein, or caramelized sugar.

36. The radio frequency identification tag of claim 21, wherein the physiological response data comprises at least one of an adverse responses to food data, a food allergy data, a food intolerances data, or metabolite data.

* * * * *